United States Patent
Neumann et al.

(10) Patent No.: US 7,895,019 B2
(45) Date of Patent: Feb. 22, 2011

(54) FIRE SUPPRESSION SYSTEM DESIGN TOOL

(75) Inventors: Mark Neumann, Peshtigo, WI (US); William Klingenmaier, Nadeau, MI (US); Joseph Michael Pada, Marinette, WI (US)

(73) Assignee: Tyco Fire Products LP, Lansdale, PA (US)

( * ) Notice: Subject to any disclaimer, the term of this patent is extended or adjusted under 35 U.S.C. 154(b) by 1398 days.

(21) Appl. No.: 11/344,851

(22) Filed: Feb. 1, 2006

(65) Prior Publication Data

US 2007/0179758 A1    Aug. 2, 2007

(51) Int. Cl.
    *G06F 17/50* (2006.01)
(52) U.S. Cl. .................. 703/1; 707/102; 715/848; 236/49.1
(58) Field of Classification Search .......... 703/1, 703/2; 707/10, 104.1, 102; 715/848; 169/61–62; 236/49, 49.1
    See application file for complete search history.

(56) References Cited

U.S. PATENT DOCUMENTS

| 6,873,717 | B2 | 3/2005 | Lure et al. |
| 7,039,653 | B2* | 5/2006 | Beyerle et al. ........... 707/104.1 |
| 7,048,199 | B2* | 5/2006 | Melink ................ 236/49.3 |
| 7,195,180 | B2* | 3/2007 | Lee ...................... 239/398 |
| 7,209,870 | B2* | 4/2007 | Simmons et al. .......... 703/1 |
| 2001/0047251 | A1* | 11/2001 | Kemp ..................... 703/1 |
| 2007/0255536 | A1* | 11/2007 | Simmons et al. .......... 703/1 |
| 2008/0115950 | A1* | 5/2008 | Haaland et al. .......... 169/62 |
| 2009/0120653 | A1* | 5/2009 | Thomas ................. 169/61 |

* cited by examiner

*Primary Examiner*—Thai Phan
(74) *Attorney, Agent, or Firm*—Brinks Hofer Gilson & Lione

(57) ABSTRACT

A method of designing a fire suppression system that includes displaying one or more components of the fire suppression system on a visual display, wherein the displayed one or more components of the fire suppression system are formatted so as to printable in a form acceptable for a majority of state and local regulatory authorities empowered to regulate installation of the fire suppression system.

16 Claims, 22 Drawing Sheets

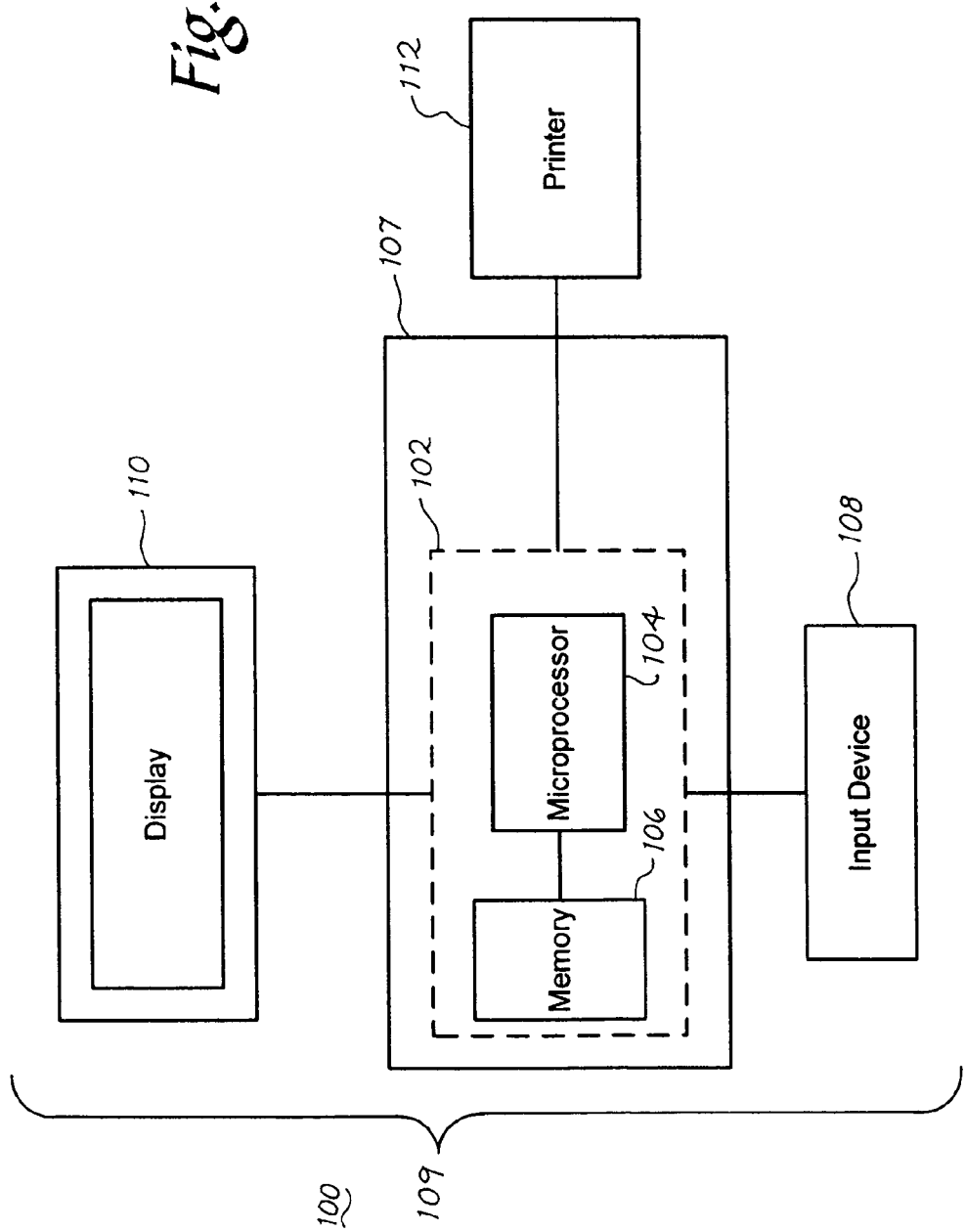

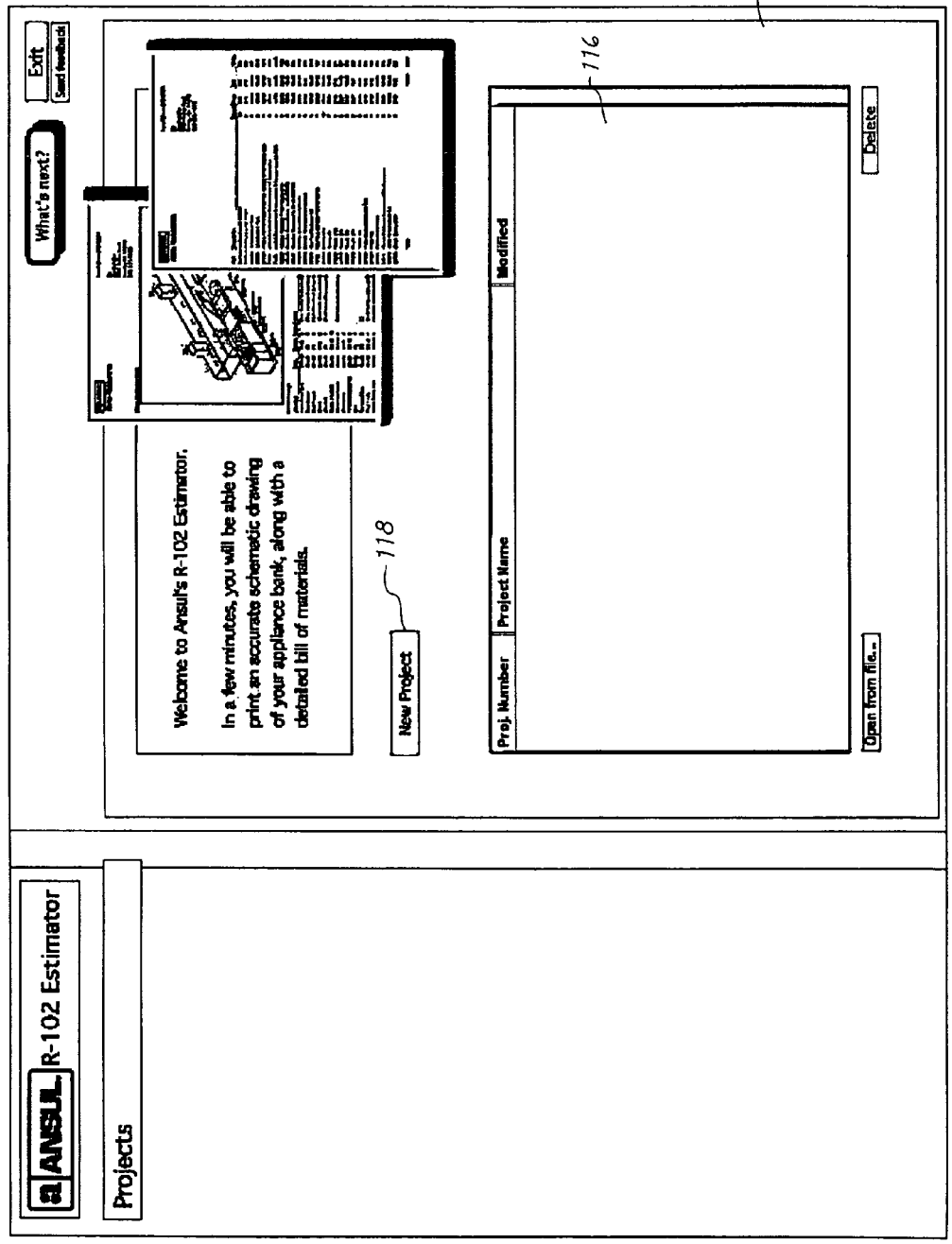

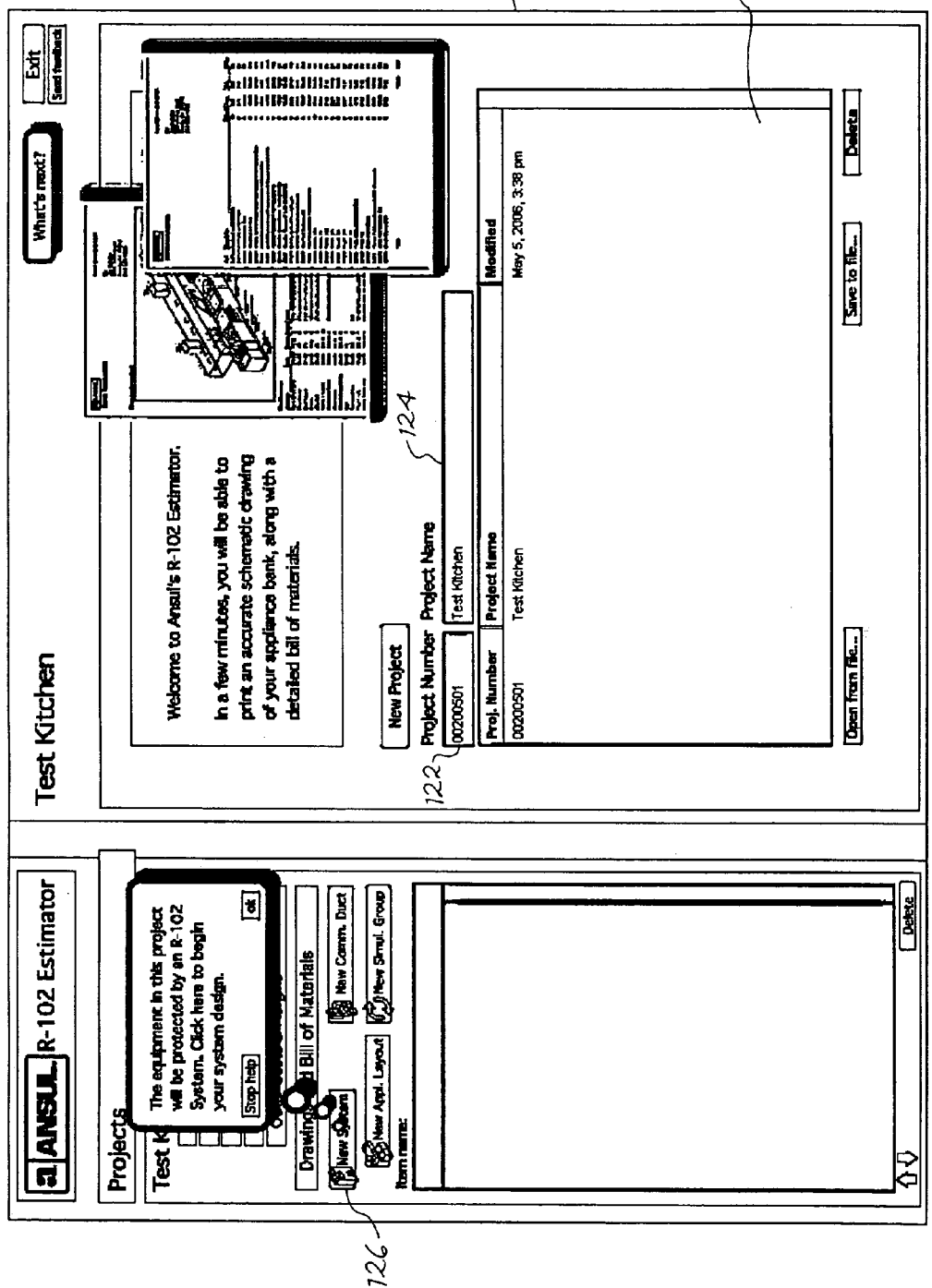

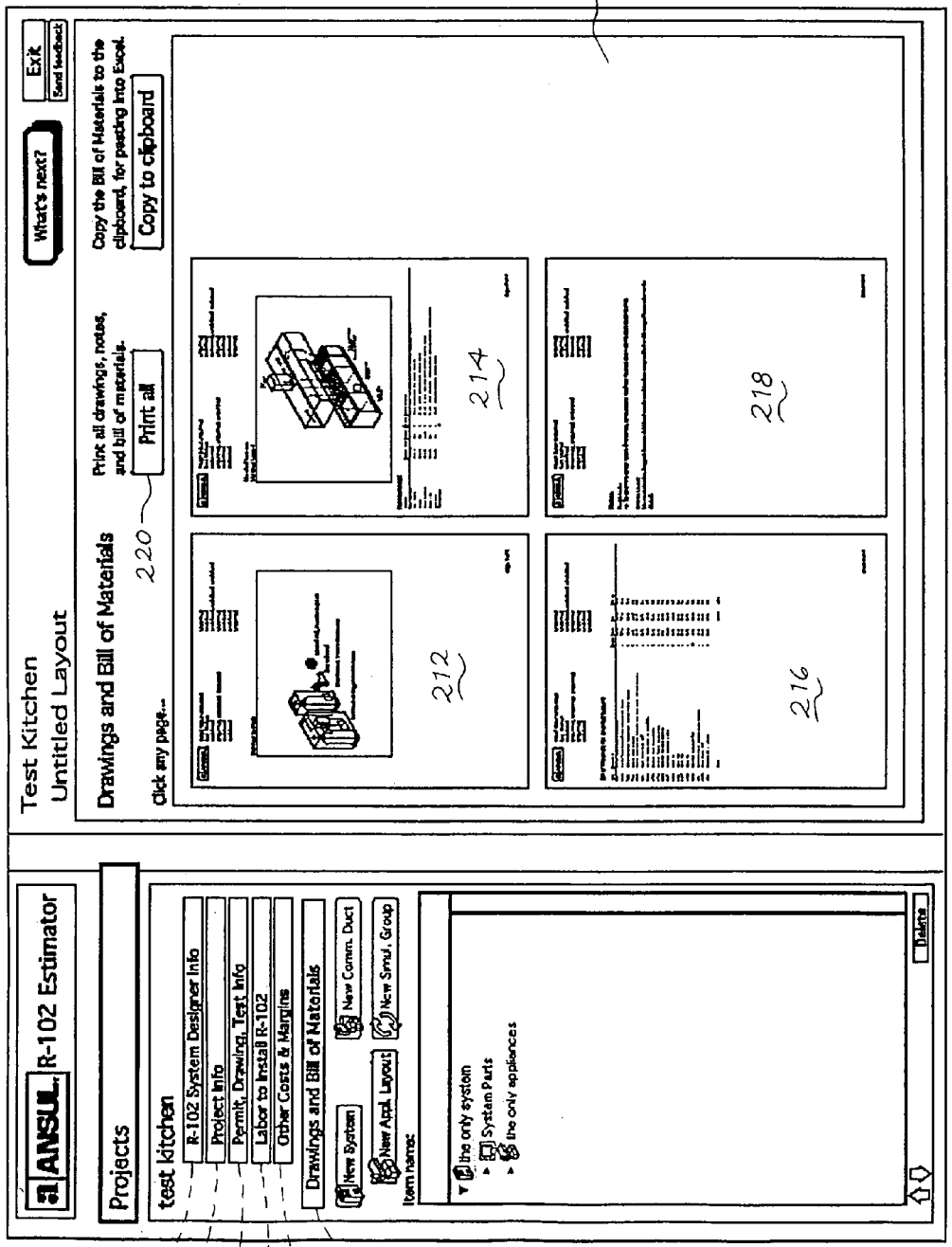

FIRE SUPPRESSION SYSTEM DESIGN TOOL

BACKGROUND OF THE INVENTION

1. Field of the Invention

The present invention relates to devices and processes that aid in the design and/or the permit process involved with constructing a fire suppression system.

2. Related Art

It is well known that kitchens for commercial establishments, such as restaurants and hotels, are subject to local and state regulations and laws that impact the overall design of the kitchens. For example, local and state regulations generally require a sufficient fire suppression system be in place in a commercial kitchen before the kitchen can be operated.

In the past, the process for designing and constructing a commercial kitchen was often inefficient and time consuming. For example, the process often involved initially measuring the dimensions of the room in which the kitchen was to be installed. After the measurements were completed, they would be sent off site to a designer who would design a footprint for the room in accordance with the requirements of the local and/or state authorities empowered to regulate the design of a commercial kitchen. The designing process would be done manually by a draftsman either via drawing on paper or by using a CAD program. After the design was completed, it was then sent to a supplier who would provide an estimate of the materials needed to construct the kitchen per the design. Next, the materials would be ordered per the estimate of materials. The passing off of the design to multiple entities often resulted in significant delays in the design process.

Another inefficiency in prior design processes was that local and/or state authorities would require a drawing of the kitchen to be submitted for approval prior to construction could begin. Since the approval process often took a long amount of time, the drawings were often submitted at an early stage in the development process. The submitted drawings were often rejected for not being in the proper format. Even if the drawings were approved, the cooking staff was often not consulted prior to the submission of the drawings and, thus, they would require changes to the design that would necessitate the submission of a new set of drawings to the regulatory authorities.

Another problem with the above-mentioned design process was that it did not lead to uniformity in the design of commercial kitchens. For example, a hotel chain may have a commercial kitchen in each of its establishments. In the past, each kitchen may have been designed independent of each other. If it was desired that the kitchens were to have substantially the same dimensions and components, there was no common design for a kitchen. Accordingly, each kitchen was designed from scratch without regard to past designs. Thus, time and effort was wasted in redesigning each kitchen.

SUMMARY OF THE INVENTION

One aspect of the present invention regards a fire suppression system design tool that includes a processor and a memory in communication with the processor, wherein the memory includes a design program having a database. A visual display is in communication with the processor, wherein the processor and the design program cooperate so that a fire suppression component is displayed on the visual display and a plurality of appliances to be used with the fire suppression component are displayed on the visual display. An input device in communication with the processor, wherein the input device selects one of the plurality of appliances displayed on the visual display and a relative position between the fire suppression component and the one of the plurality of appliances.

A second aspect of the present invention regards a fire suppression system design tool having a processor and a memory in communication with the processor, wherein the memory includes a design program having a database. A visual display is in communication with the processor, wherein the processor and the design program cooperate so that a fire suppression component is displayed on the visual display and positions of one or more nozzles to be used with the fire suppression component are calculated and the one or more nozzles are displayed on the visual display with the fire suppression component taking into account the calculated positions.

A third aspect of the present invention regards a fire suppression system design tool that includes a processor and a memory in communication with the processor, wherein the memory includes a design program having a database. A visual display is in communication with the processor, wherein the processor and the design program cooperate so that one or more components of the fire suppression system are displayed on the visual display, wherein the processor formats the displayed one or more components of the fire suppression system so as to be printable in a form acceptable for a majority of state and local regulatory authorities empowered to regulate installation of the fire suppression system.

A fourth aspect of the present invention regards a method of designing a fire suppression system that includes displaying a fire suppression component on a visual display and displaying a plurality of appliances to be used with the fire suppression system on the visual display. The method farther includes selecting one of the plurality of appliances displayed on the visual display and selecting a relative position between the fire suppression component and the one of the plurality of appliances.

A fifth aspect of the present invention regards a method of designing a fire suppression system that includes displaying a fire suppression component on a visual display, calculating positions of one or more nozzles to be used with the fire suppression component and displaying the one or more nozzles on the visual display with the fire suppression component taking into account the calculated positions.

A sixth aspect of the present invention regards a method of designing a fire suppression system that includes displaying one or more components of the fire suppression system on a visual display, wherein the displayed one or more components of the fire suppression system are formatted so as to printable in a form acceptable for a majority of state and local regulatory authorities empowered to regulate installation of the fire suppression system.

A seventh aspect of the present invention regards a fire suppression system design tool that includes a processor, a memory in communication with the processor, wherein the memory has a design program having a database. A visual display in communication with the processor, wherein the processor and design program cooperate so that a fire suppression component is displayed on the visual display; and a fire protection zone is defined on the visual display, the fire protection zone represents an area that is protected by a fire suppression system associated with the fire suppression component.

An eighth aspect of the present invention regards a fire suppression system design tool that includes a processor and a memory in communication with the processor, wherein the memory has a design program having a database. A visual display in communication with the processor, wherein the processor and design program cooperate so that a fire suppression component is displayed on the visual display and one or more appliances to be used with the fire suppression component are displayed on the visual display. A warning signal is generated if the one or more appliances do not satisfy a predetermined criteria associated with the fire suppression component.

One or more aspects of the present invention provide the advantage of reducing the time and costs involved in designing and constructing a system that requires a fire suppression system.

BRIEF DESCRIPTION OF THE DRAWINGS

FIG. 1A schematically shows a first embodiment of a fire suppression system design tool in accordance with the present invention;

FIG. 2 shows an embodiment of a project launch screen that can be displayed by the fire suppression system design tools of FIGS. 1A-B;

FIG. 3 schematically shows an embodiment of a new project screen that can be used by the fire suppression system design tools of FIGS. 1A-B;

FIG. 4 schematically shows an embodiment of a summary screen that can be used by the fire suppression system design tools of FIGS. 1A-B;

FIG. 9 shows the screen of FIG. 8 when a nozzle is selected;

Figure 16:
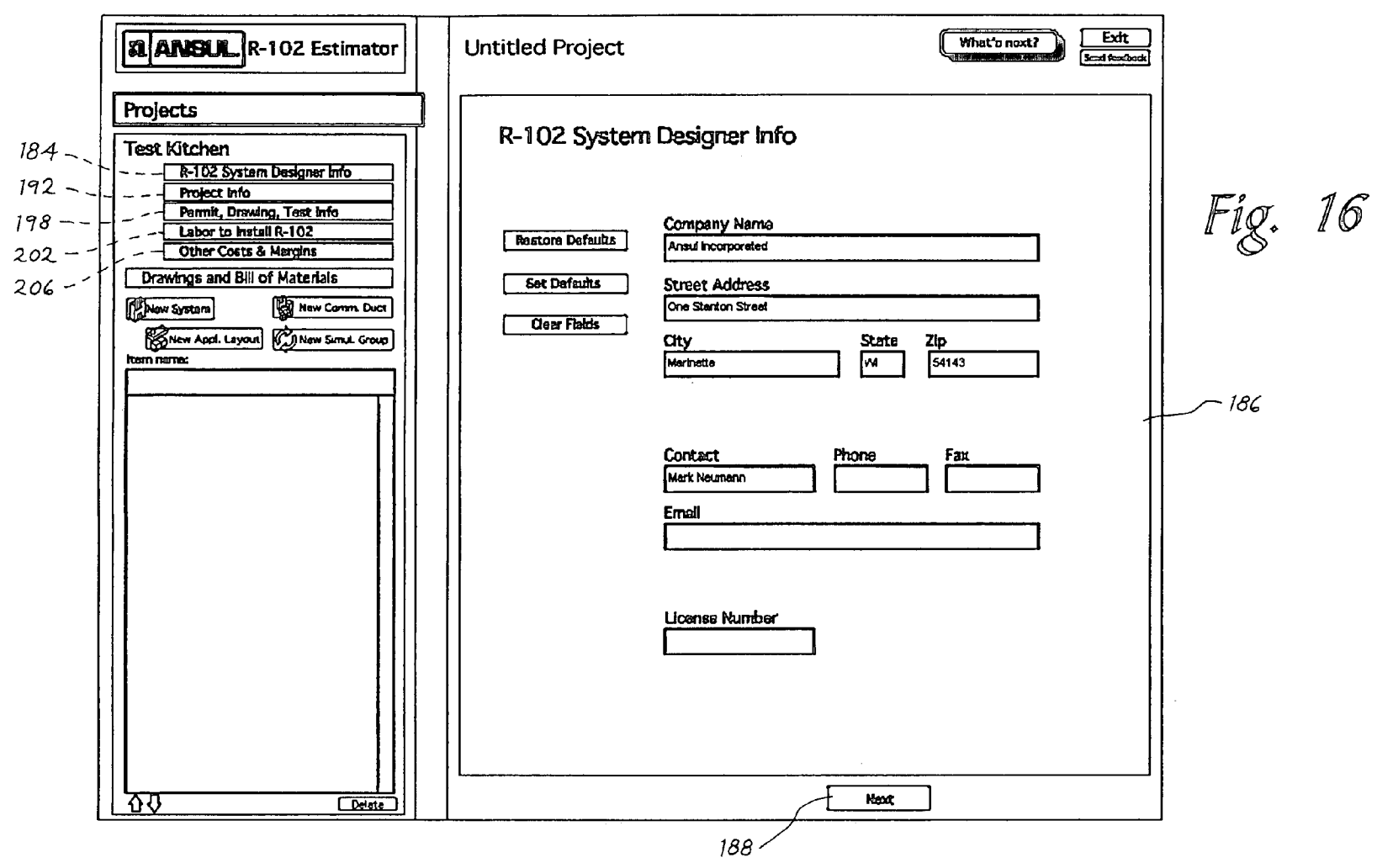

FIG. 16 schematically shows an embodiment of a "System Designer Info" screen that can be used by the fire suppression system design tools of FIGS. 1A-B;

FIG. 17 schematically shows an embodiment of an "Project Info" screen that can be used by the fire suppression system design tools of FIGS. 1A-B;

FIG. 18 schematically shows an embodiment of a "Permit, Drawing, Test Information" screen that can be used by the fire suppression system design tools of FIGS. 1A-B;

FIG. 19 schematically shows an embodiment of a "Labor to Install System" screen that can be used by the fire suppression system design tools of FIGS. 1A-B;

FIG. 20 schematically shows an embodiment of a "Pipe and Conduit Information" screen that can be used by the fire suppression system design tools of FIGS. 1A-B; and FIG. 21 schematically shows an embodiment of a "Drawings and Bill of Materials" screen that can be used by the fire suppression system design tools of FIGS. 1A-B.

DETAILED DESCRIPTION OF THE DRAWINGS AND THE PRESENTLY PREFERRED EMBODIMENTS

Figure 1B:
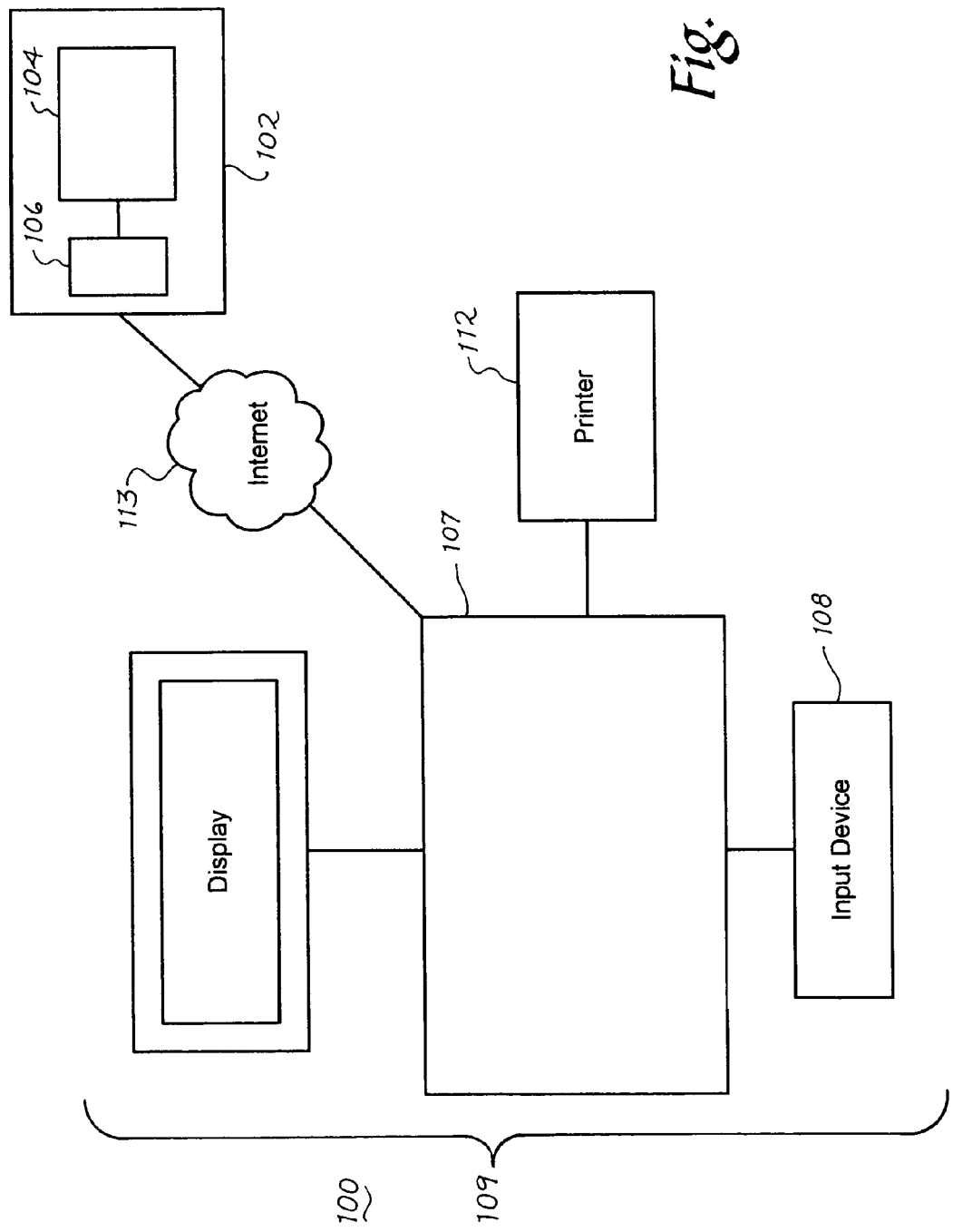
FIG. 1B schematically shows a second embodiment of a fire suppression system design tool in accordance with the present invention.

FIG. 1A schematically shows an embodiment of a fire suppression system design tool 100 that includes a design system 102 having a processor, such as microprocessor 104, in communication with a memory 106 as well as with other components (not shown) present within the chassis 107 of the computer hardware system. The memory 106 stores a design program that includes a database, the contents of which will be discussed below.

Data is input into the microprocessor 104 via an input device 108. Examples of possible input devices 108 are a keyboard, a microphone, a touch screen or a mouse that are part of the computer hardware system, such as a laptop computer 109. It is possible to have the laptop computer 109 directly connected to the design system 102 via a hardwire connection. In another alternative, the design system 102 is incorporated in the computer hardware system itself. A visual display 110 and a printer 112 can be electrically connected to or form part of the computer hardware system.

In an alternative embodiment, the design system 102 is located at an off-site location and the laptop computer 109 is connected to the design system 102 via the Internet 113 as shown in FIG. 1B. In this scenario, data is input via input device 108 that is connected to the laptop computer 109. The data is then sent from the laptop computer 109 via the Internet in a well known manner to an offsite computer that contains the design system 102. Thus, the ability to have the design system 102 at a different site than that of the laptop computer 109 allows for flexibility in conducting the design process.

In general, once data is input into the microprocessor 104, the design program and the microprocessor cooperate with one another so as to take the data and perform several functions that are directed to the design and construction of structures, such as commercial kitchens, that require fire suppression systems. A sample of the functions performed is described hereinafter with respect to the various screens shown in FIGS. 2-21.

With the above mentioned descriptions for possible structures for the fire suppression system design tool 100 kept in mind, operation of the fire suppression system design tool 100 will be described hereinafter. As shown in FIG. 2, once the fire suppression system design tool 100 is activated a "Project Launch" screen 114 pops up on visual display 110. The screen 114 includes a table 116 that lists design projects that have been previously begun or completed by a user of the fire suppression system design tool 100. The listed projects are identified by number, project name and the date the projects were last modified by the fire suppression system design tool 100. A listed project can be brought up for review or alteration by clicking on the project via input device 108.

Should the user wish to begin a new project, then the "New Project" area 118 is clicked resulting in the new project screen 120 being displayed on visual display 110. The screen 120 includes a project number area 122 and a project name area 124. The user enters a unique number in area 122 and project name in area 124 that uniquely identify a particular design project. As shown in FIG. 3, the screen 120 retains the table 116 of screen 114 and includes the project number and project name information entered in areas 122 and 124.

Figure 4:
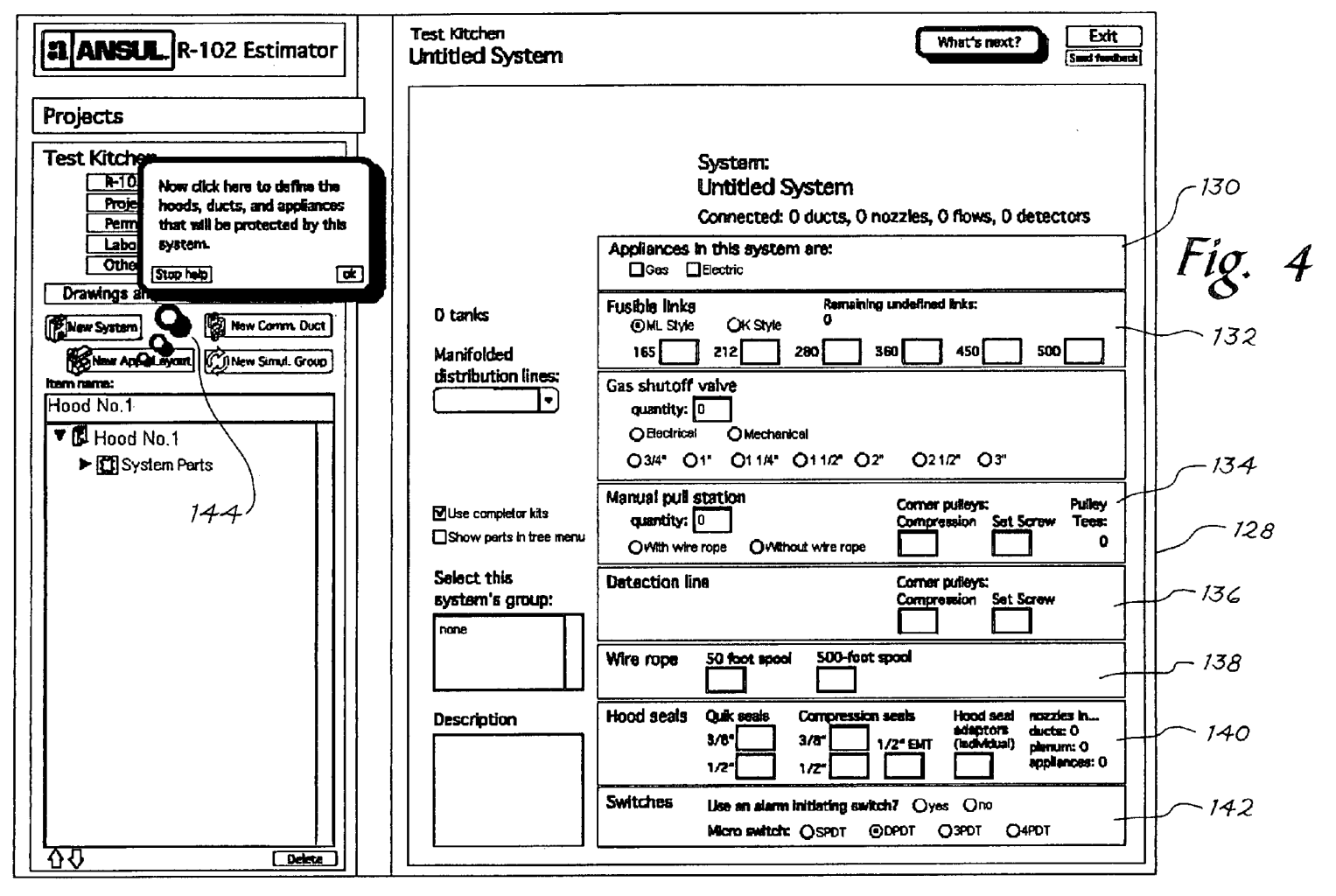

Once the above described identification is completed, a prompt will appear requesting the user to activate the "New System" button 126. Activation of button 126 results in the summary screen 128 appearing on visual display 110. As shown in FIG. 4, the summary screen 128 lists various system components that are associated with a fire suppression device, such as a ventilation hood, that is selected to be used for the kitchen design. For example, the summary screen 128 lists appliances (window 130), fusible links (window 132), manual pull stations and associated corner pulleys (window 134), detection lines and associated corner pulleys (window 136), wire rope (window 138), hood seals (window 140) and switches (window 142) associated with the hood. The contents of the summary screen 128 are updated as various system components are selected by the user.

Figure 5:
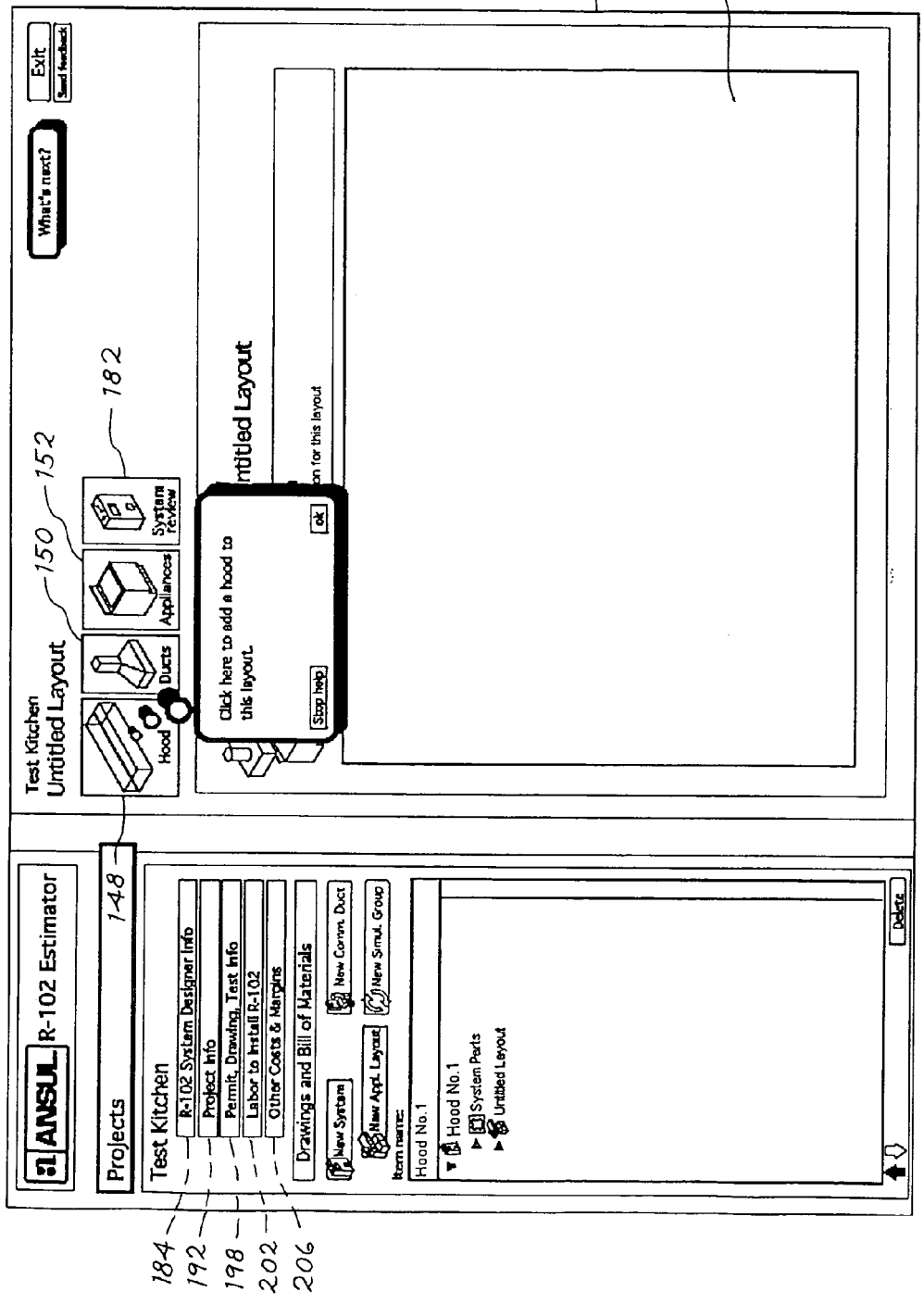
FIG. 5 schematically shows an embodiment of a system component screen that can be used by the fire suppression system design tool of FIGS. 1A-B.

In order to add system components to the kitchen project corresponding to the summary screen 128, the "New Appl. Layout" button 144 is activated. A system component screen 146 is then displayed on visual display 110. As shown in FIG. 5, the system component screen 146 displays several icons 148, 150, 152 that represent various system components to be used in the kitchen design. For example, the icons can represent ventilation hoods (icon 148), ducts (icon 150) and appliances (icon 152) to be used in the design. In the case when no system components have been previously selected, it is desirable to select a ventilation hood prior to selecting any other system components since the type of ventilation hood selected controls/limits the possible selections for the other system components. In the case of the selection of appliances, local and state ordinances require that the appliances lie entirely under a ventilation hood and so the selection of the number and size of appliances will be constrained by the type and size of the ventilation hood selected. If the ventilation hood is selected first, then appliances can be selected by the fire suppression system design tool 100 so as to fit under the hood. However, if the appliances are selected first, there is no guarantee that a suitable ventilation hood will be available to cover all of the selected appliances. In that case, the appliances would need to be reselected. In order to avoid the delay that would result from such reselection, the present invention prefers the selection of the ventilation hood be made prior to all other system components. Of course, the tool 100 allows for the selection of the ducts and/or the appliances prior to the selection of the ventilation hood.

Figure 6:
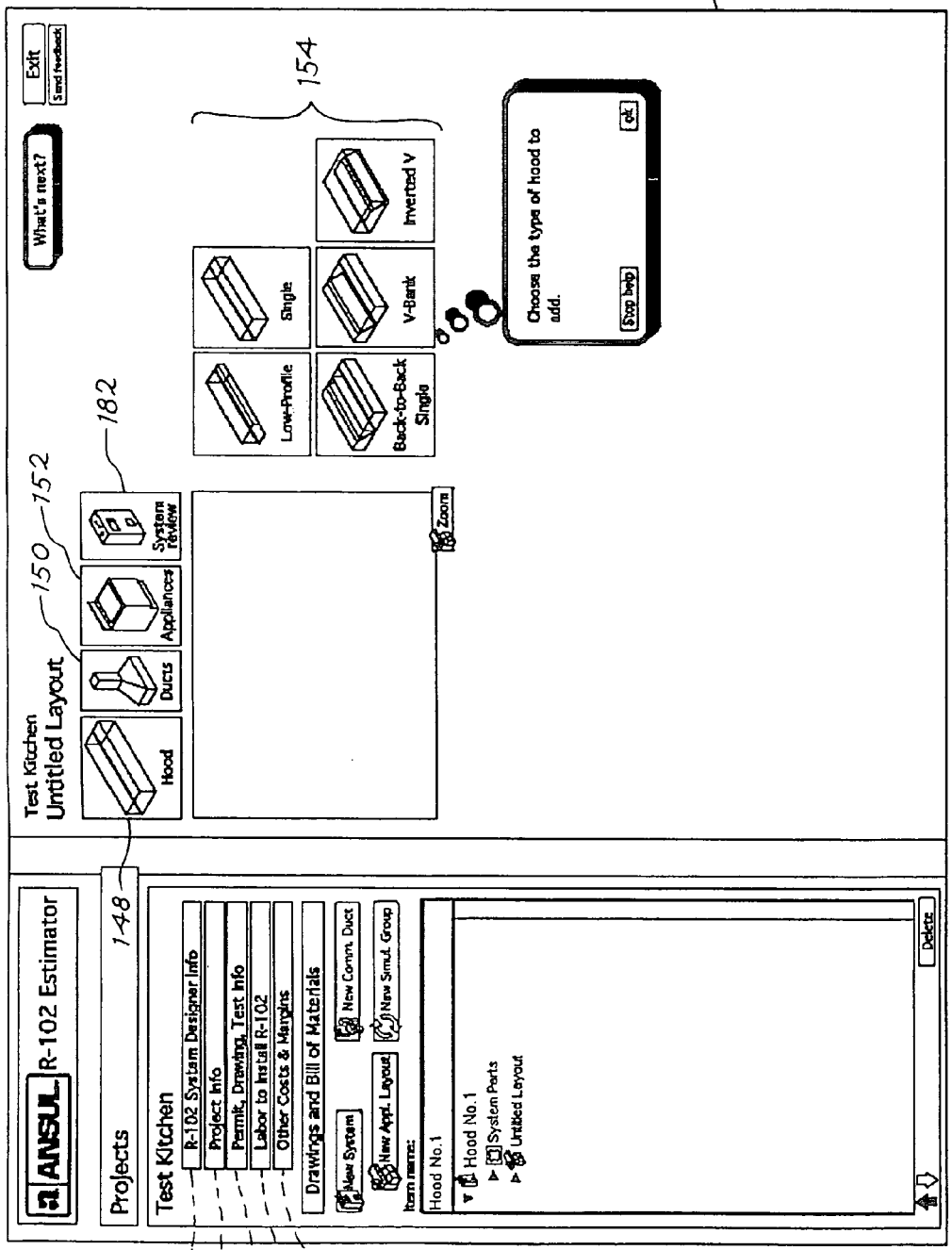
FIG. 6 shows the screen of FIG. 5 when several types/styles of hoods are shown.
Figure 7:
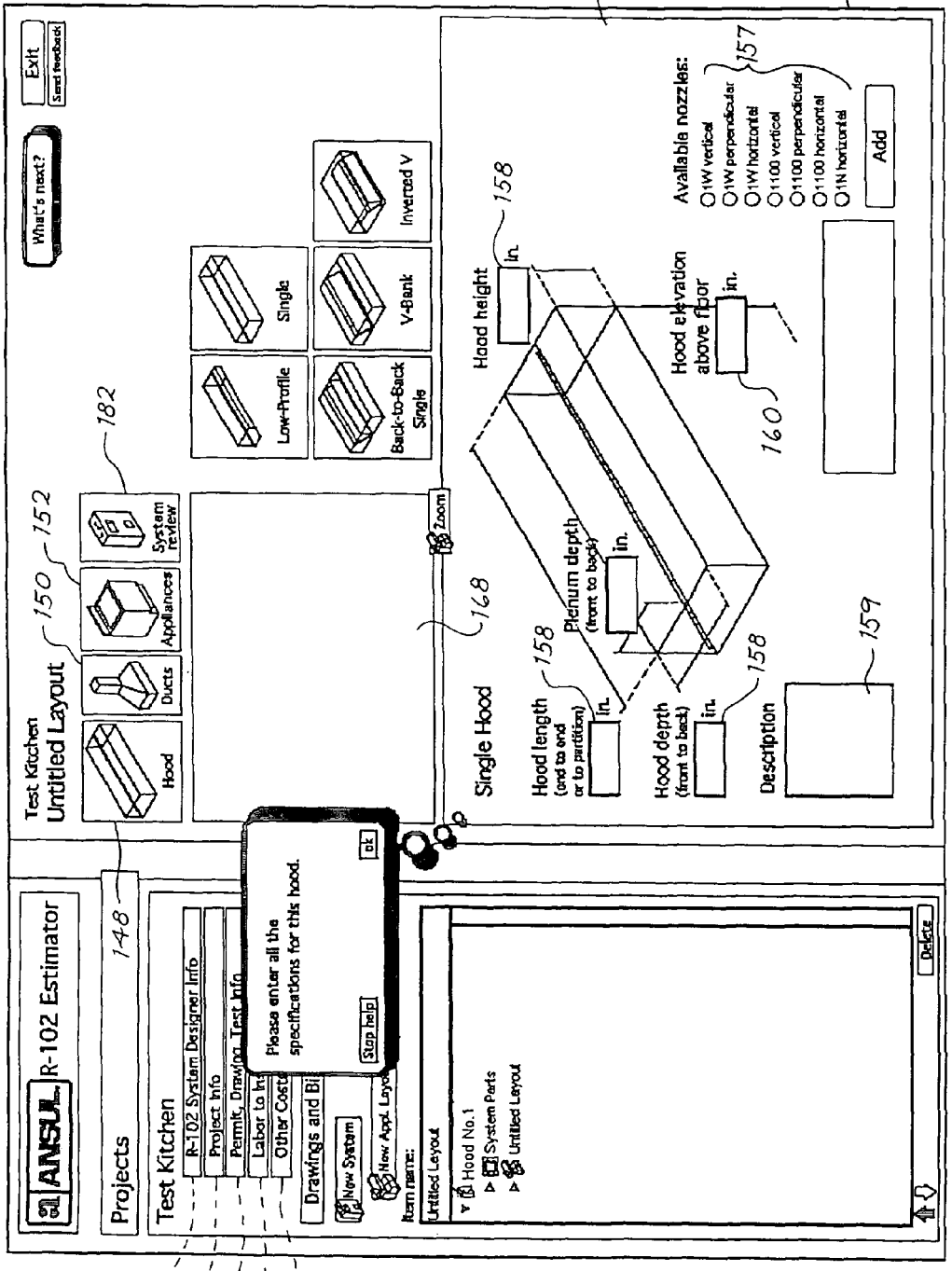
FIG. 7 shows the screen of FIG. 6 when a hood is chosen.

Once the icon 148 is selected, several types/styles of ventilation hoods 154 are shown in the system component screen 146. For example, low profile, single filter bank, canopy, back-to-back single filter bank canopy, V-bank center island and inverted V-bank center island ventilation hoods can be displayed as shown in FIG. 6. The user selects a type/style of ventilation hood by clicking on the corresponding hood shown on screen 146. At this stage, a perspective and schematic view of the selected ventilation hood is shown in window 156 as shown in FIG. 7. The screen 156 also includes a list 157 of nozzles that are available for the selected ventilation hood. Furthermore, several data entry areas 158 are displayed that allow the user to input desired dimensions of the ventilation hood, such as the length, depth and height. In addition, a data entry area 160 may be presented that allows the user to choose the elevation of the ventilation hood above the floor. A window 159 is available for the user to type in comments regarding the ventilation hood or the kitchen design in general.

Figure 8:
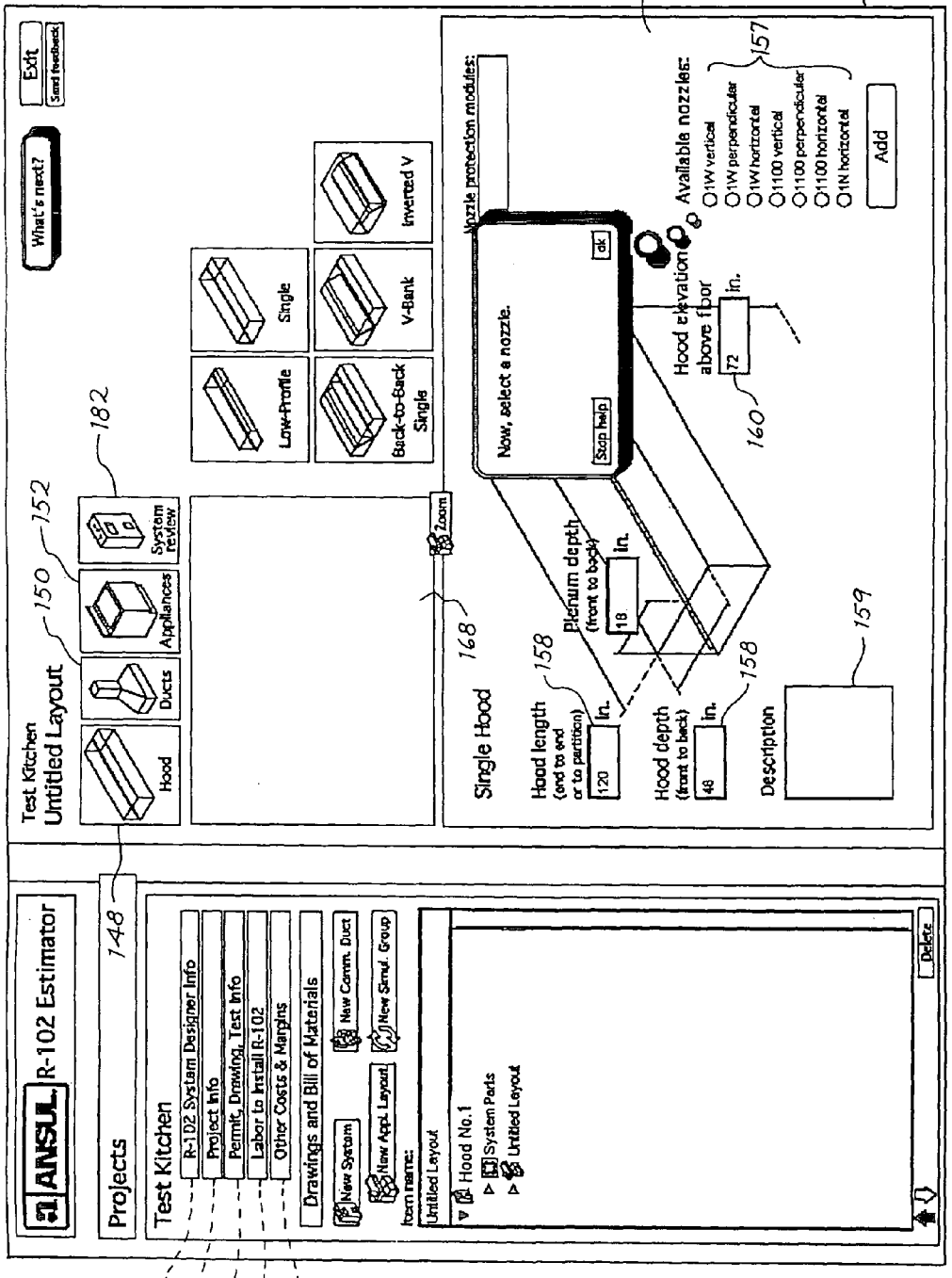
FIG. 8 shows the screen of FIG. 7 when system component screen when the dimensions of the hood are entered and several types/styles of nozzles are highlighted.
Figure 9:
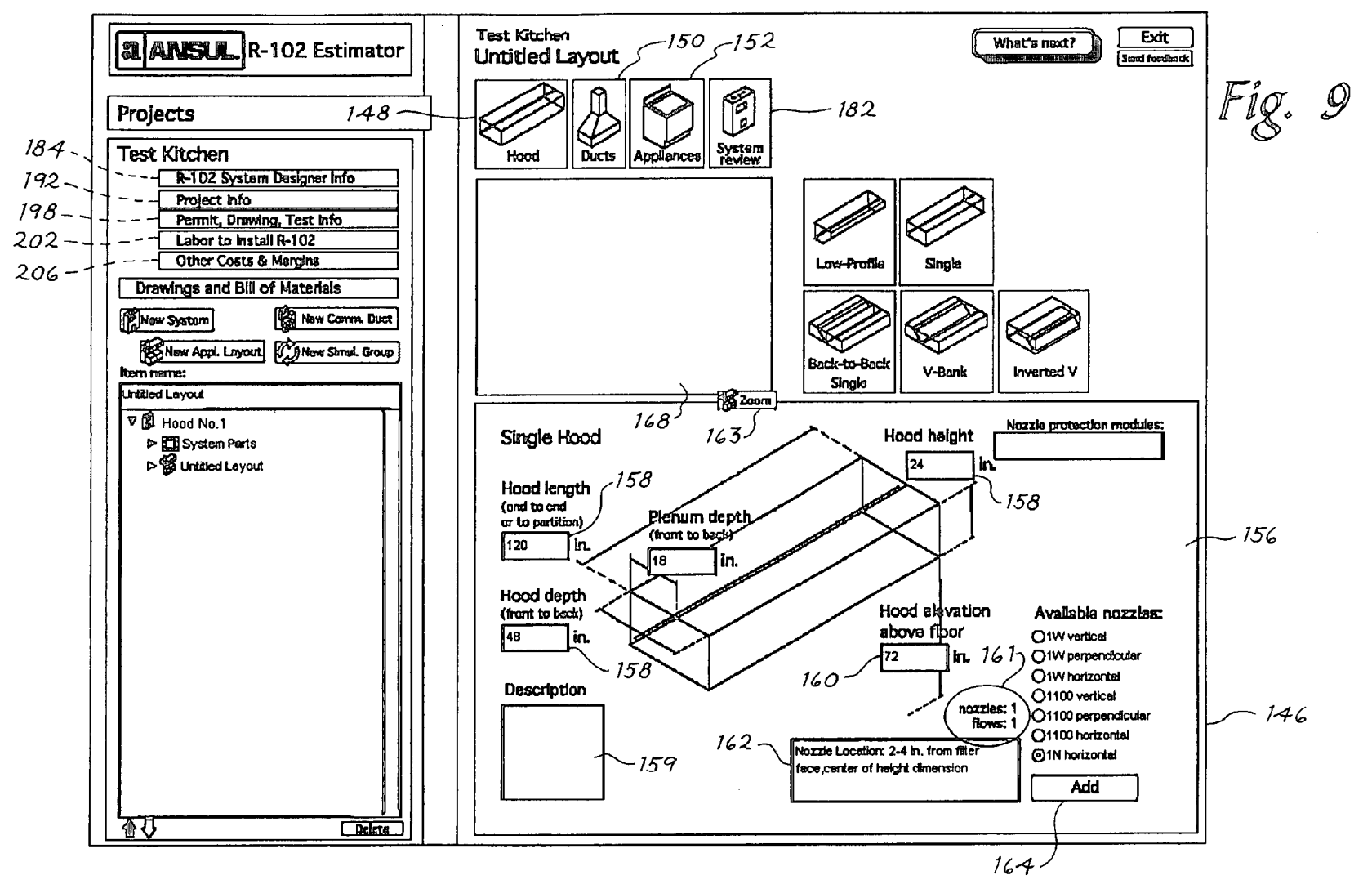

After the areas 158 and 160 have been filled in, the screen 146 highlights only those nozzles present in list 157 that are approved for use with the selected ventilation hood with the dimensions entered as shown in FIG. 8. At this stage one of the highlighted nozzles is chosen by clicking on the corresponding circle adjacent to the nozzle. Once a type of nozzle is chosen the minimum number of nozzles and flows required by manufacturers or state or local ordinance is displayed in window 156 as shown in FIG. 9 (see circled area 161). The flow value is assigned to each nozzle and tank and is related to the amount of agent that passes through a nozzle and how many flow points are stored in each tank. Note that the flow capacity of each nozzle is used to determine the quantity of tanks needed to cover a certain group of hazards. Furthermore, the location of the nozzle with respect to a point of reference, such as a hazard, and an aim point of the nozzle are displayed in window 162. Note that the locations and aim points for the nozzles as displayed in window 162 are stored in memory 106 and reflect values that optimize the suppression of fire for each hazard (i.e., fryer, griddle, char broiler) selected for the kitchen design as determined by performing UL standard tests for each hazard selected for the kitchen design. Assuming that the hood model, hood dimensions and nozzle and flow specifications displayed in window 156 are correct, then the "Add" button 164 is activated so that the displayed information is stored for the kitchen design. Activation of the "Add" button 164 results in a window forming that is similar to window 168 of FIG. 9 and which displays a schematic drawing of the ventilation hood selected and with the selected dimensions. In addition, the nozzle locations (see arrows) and the aim points (different color) are shown. Clicking on the ventilation hood shown in the window results in an enlarged view of the ventilation hood being shown per FIG. 10. Clicking on the ventilation hood shown in FIG. 10 results in the display of a screen similar to that shown in FIG. 8 wherein window 168 contains the selected ventilation hood.

Additional ventilation hoods can be selected at this time. This is done by clicking on icon 148 and selecting a ventilation hood and associated nozzle in the same manner as described previously with respect to FIGS. 6-10. Assuming that the hood model, hood dimensions and nozzle and flow specifications displayed in window 156 are correct, then the "Add" button 164 is activated so that the displayed information is stored for the kitchen design. Activation of the "Add" button 164 results in a window forming that is similar to window 168 of FIG. 9 and which displays a schematic drawing of all ventilation hoods that have been selected and with the selected dimensions. The latest selected ventilation hood is positioned adjacent to and to the right of the previously selected ventilation hood. Thus, a drawing of the kitchen begins to form.

Figure 10:
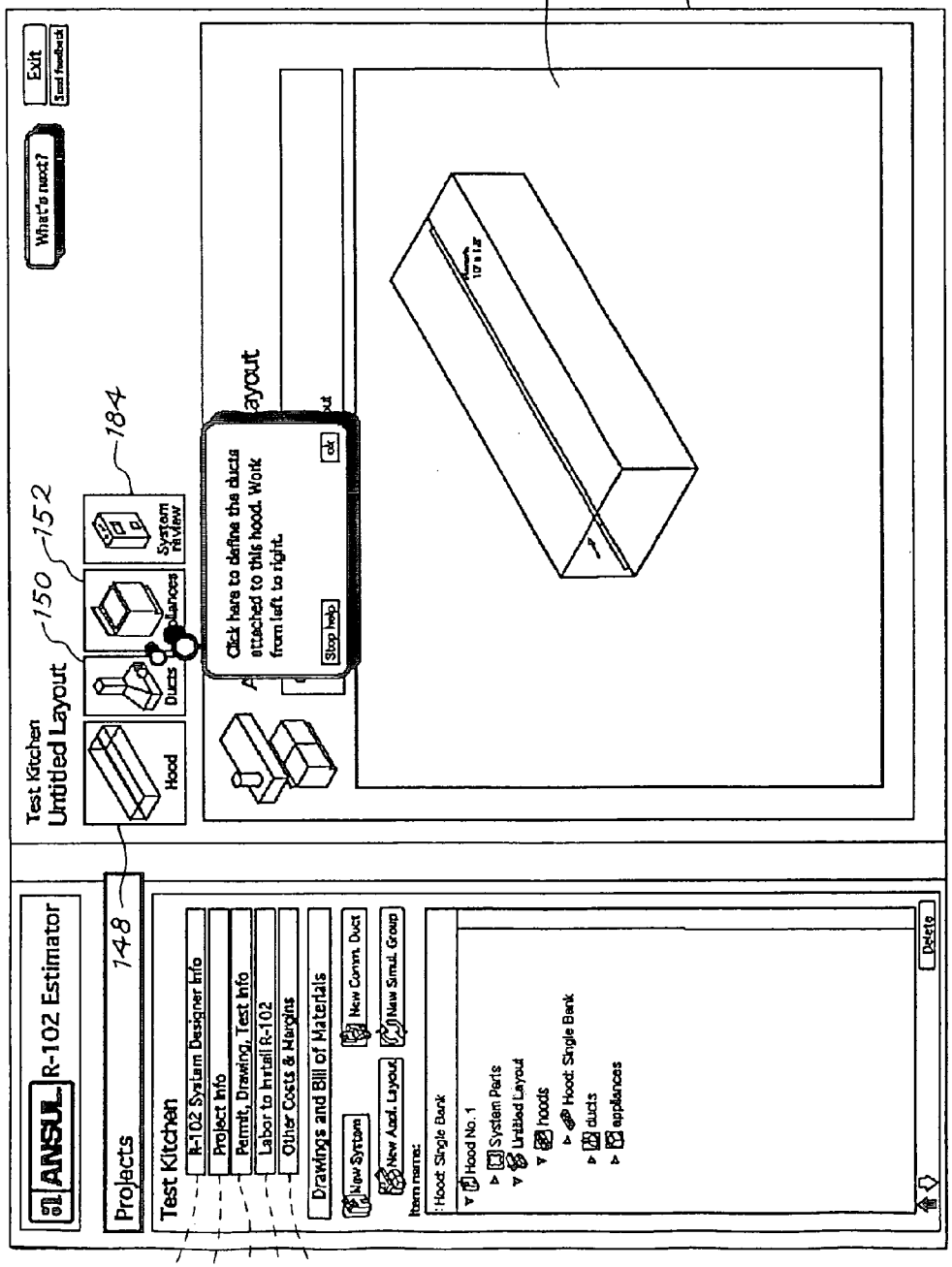
FIG. 10 shows the screen of FIG. 9 when a hood and nozzle are selected.
Figure 11:
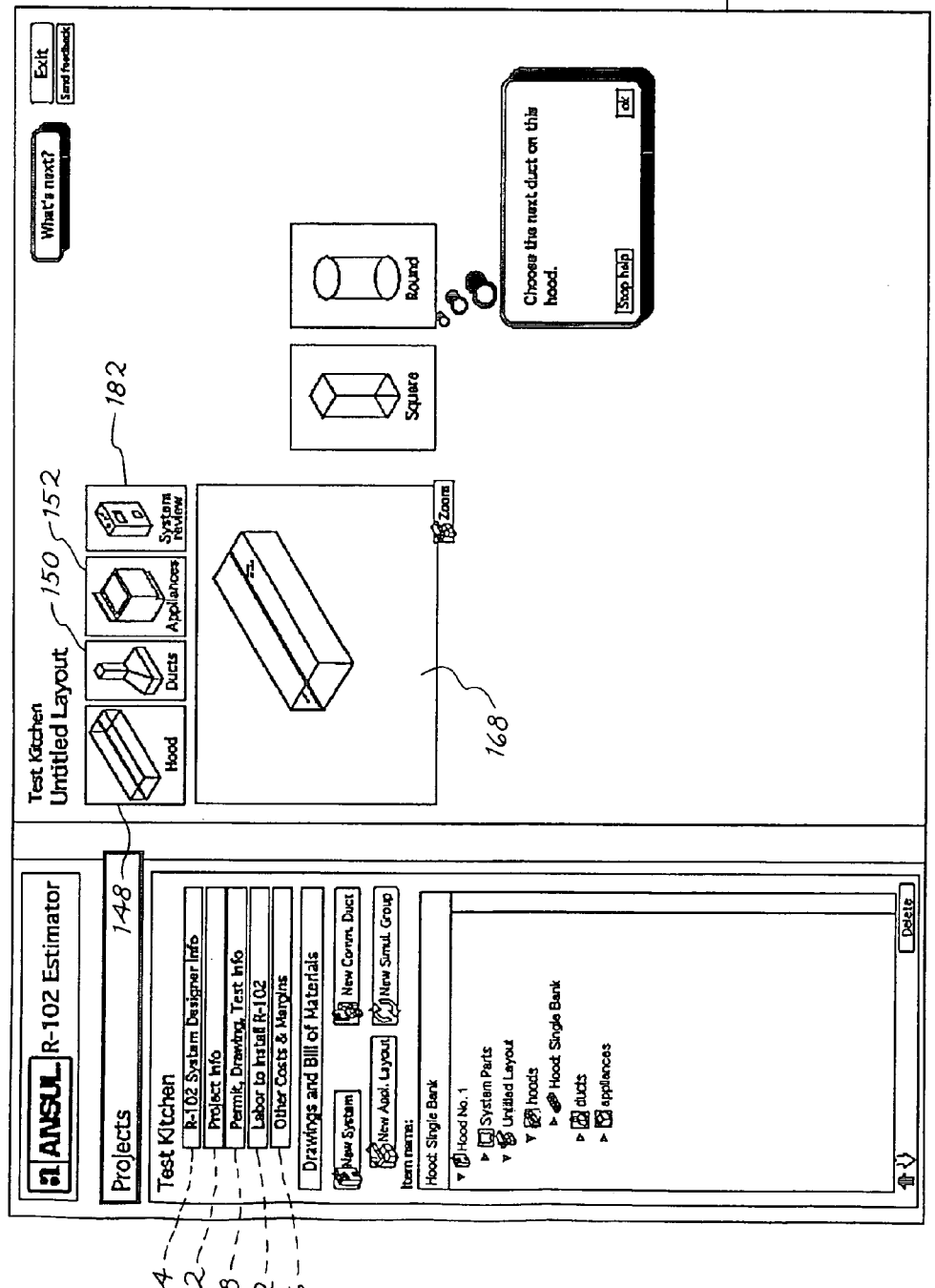
FIG. 11 shows the screen of FIG. 5 when types/styles of ducts are to be selected.

Once all of the ventilation hoods have been selected, the user activates a "zoom" button 163 (see FIG. 9) which results in an enlarged schematic view of the selected ventilation hoods to be shown per FIG. 10. At this stage, the user clicks on icon 150 so that the selection of ducts to be attached to the previously selected ventilation hoods can be performed. Once icon 150 is activated, several types/styles of ducts 166 are shown in the system component screen 146. For example, square and round ducts can be displayed as shown in FIG. 11. In addition, a schematic drawing of the selected ventilation hood is shown in window 168. The user selects a type/style of duct by clicking on the corresponding duct shown on screen 146 of FIG. 11. At this point a screen (not shown) similar to the one shown in FIG. 7 appears. The screen includes a list of nozzles that are available for the selected duct. Several data entry areas are displayed that allow the user to input desired dimensions of the duct, such as the depth and width. In addition, a data entry area may be presented that allows the user to choose the distance from an edge of the ventilation hood (or a center of a previously selected duct) to the center of the duct.

A window is also available for the user to type in comments regarding the duct or the kitchen design.

After the data entry areas have been filled in, the screen highlights only those nozzles present in the previously mentioned list of nozzles that are approved for use with the selected duct. At this stage one of the highlighted nozzles is chosen in a manner similar to the selection of the nozzle for the ventilation hood mentioned previously. Once a type of nozzle is chosen the minimum number of nozzles and flows required to protect the selected hazard(s) are displayed. Furthermore, the location of the nozzle (arrow) with respect to a point of reference, such as the center of the duct opening, and an aim point are displayed. Note that the location for the nozzle and aim point as displayed on the screen are stored in memory 106. As mentioned previously, the stored values reflect values that optimize the suppression of fire for each selected hazard as determined by performing UL standard tests for each selected hazard. Assuming that the duct model, duct dimensions and nozzle and flow specifications are correct, then an "Add" button is activated so that the displayed information is stored for the kitchen design. Activation of the "Add" button 164 results in a window forming that is similar to window 168 of FIG. 9 and which automatically displays a schematic drawing of the ventilation hood(s) and duct(s) selected and with the selected dimensions. The drawing also shows the locations of the detectors (inverted "U" in drawing) and the nozzles (arrows) In the case of detectors, their locations are in accordance with National Fire Protection Association (NFPA) standards which state that a detector will be located above each individual appliance, or if an appliance is under a duct detector, that detector will act as the detector for both the duct and the appliance under the duct. The schematic drawing shows the duct attached to the ventilation hood so as to take into account the previously selected dimensions and positioning of the duct. Additional ducts can be added in a manner similar to that described with respect to the ventilation hood selection process described previously with respect to FIGS. 6-10. Note that ducts are added from left to right as viewed on the screen.

Figure 12:
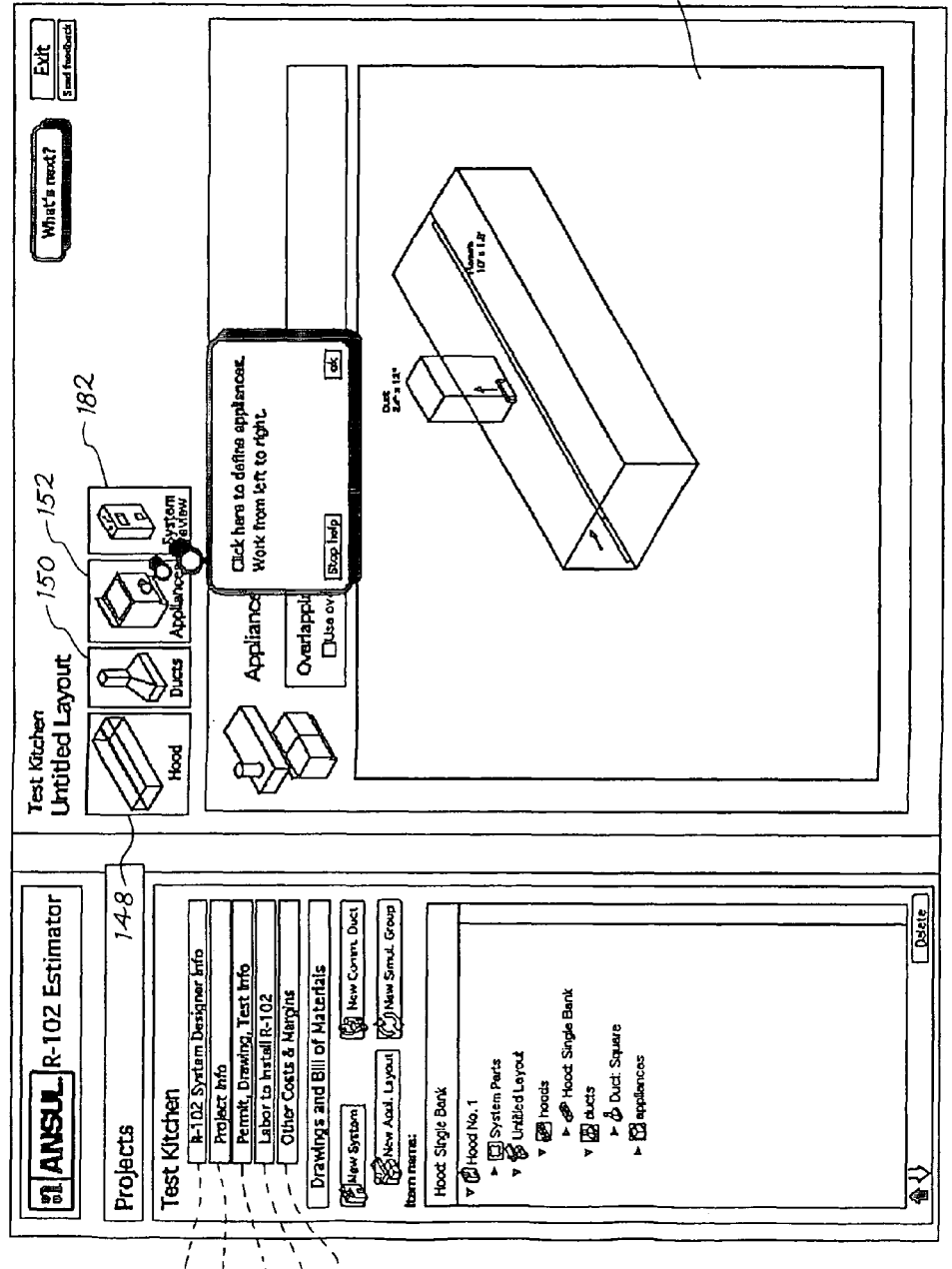
FIG. 12 shows the screen of FIG. 11 when a duct is selected.

Once all of the ducts have been selected, the user activates a "zoom" button which results in an enlarged schematic view of the selected ventilation hoods and ducts to be shown per FIG. 12. At this stage, the user clicks on icon 152 so that the selection of appliances to be placed underneath the previously selected ventilation hood(s) can be performed. Once icon 152 is activated, several types/styles of appliances 170 are shown in the system component screen 146. For example, a griddle, a fryer, a char broiler, a range, a salamander broiler, an upright broiler, a chain broiler and a tilt skillet/braising pan can be shown as shown in FIG. 13.

Figure 13:
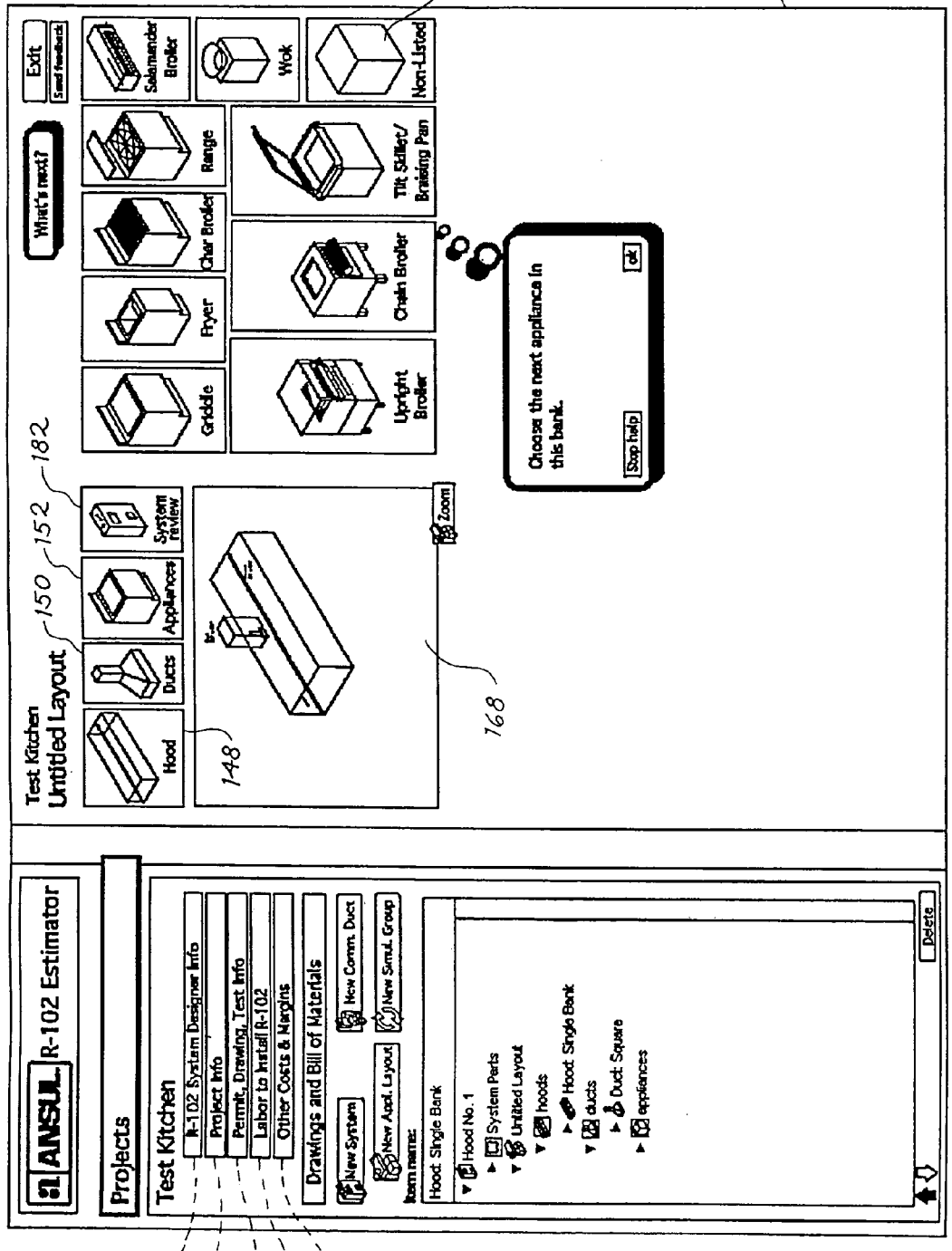
FIG. 13 shows the screen of FIG. 4 when types/styles of appliances are to be chosen.
Figure 14:
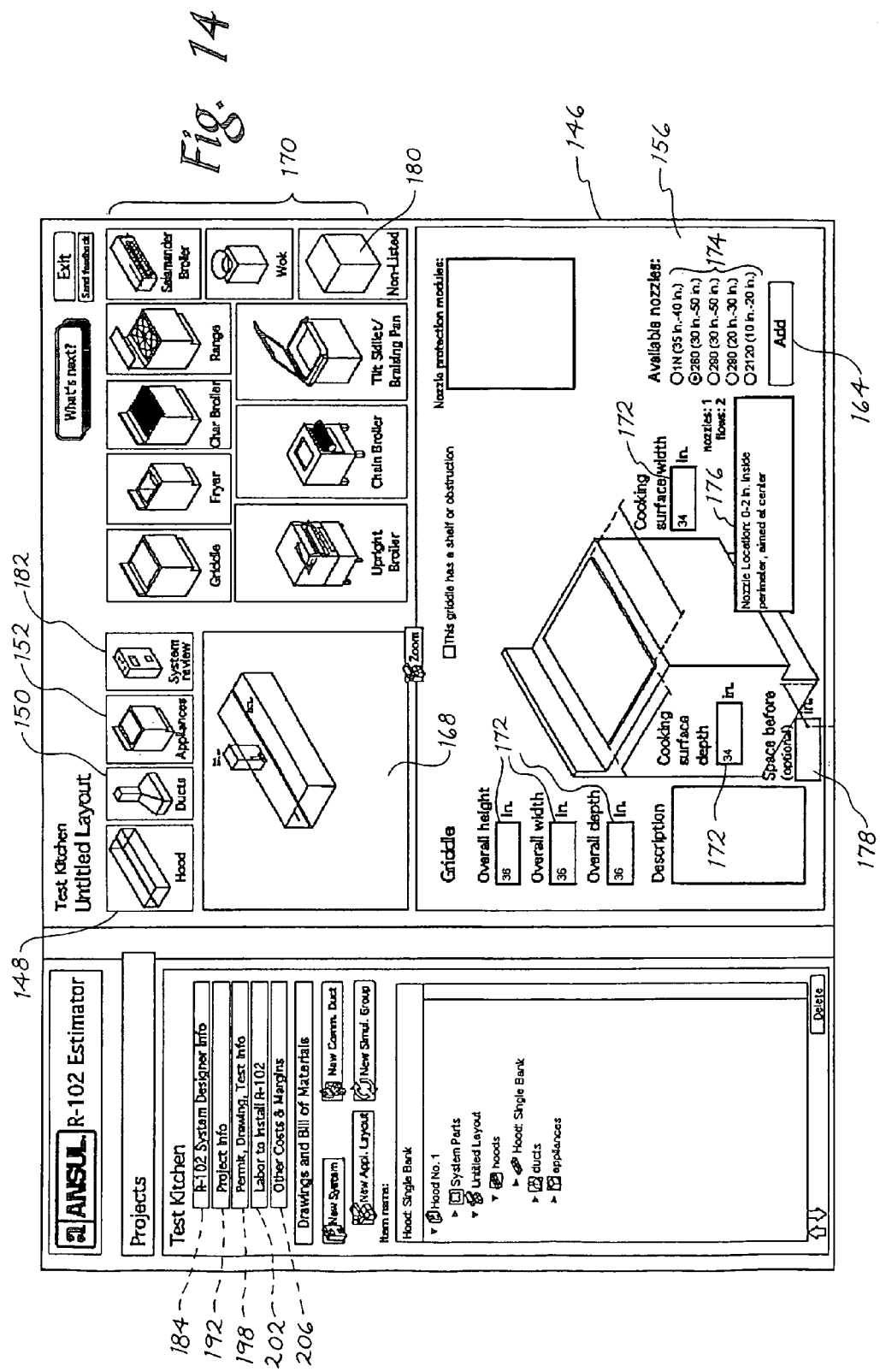
FIG. 14 shows the screen of FIG. 13 when the dimensions of a selected appliance are chosen.
Figure 15:
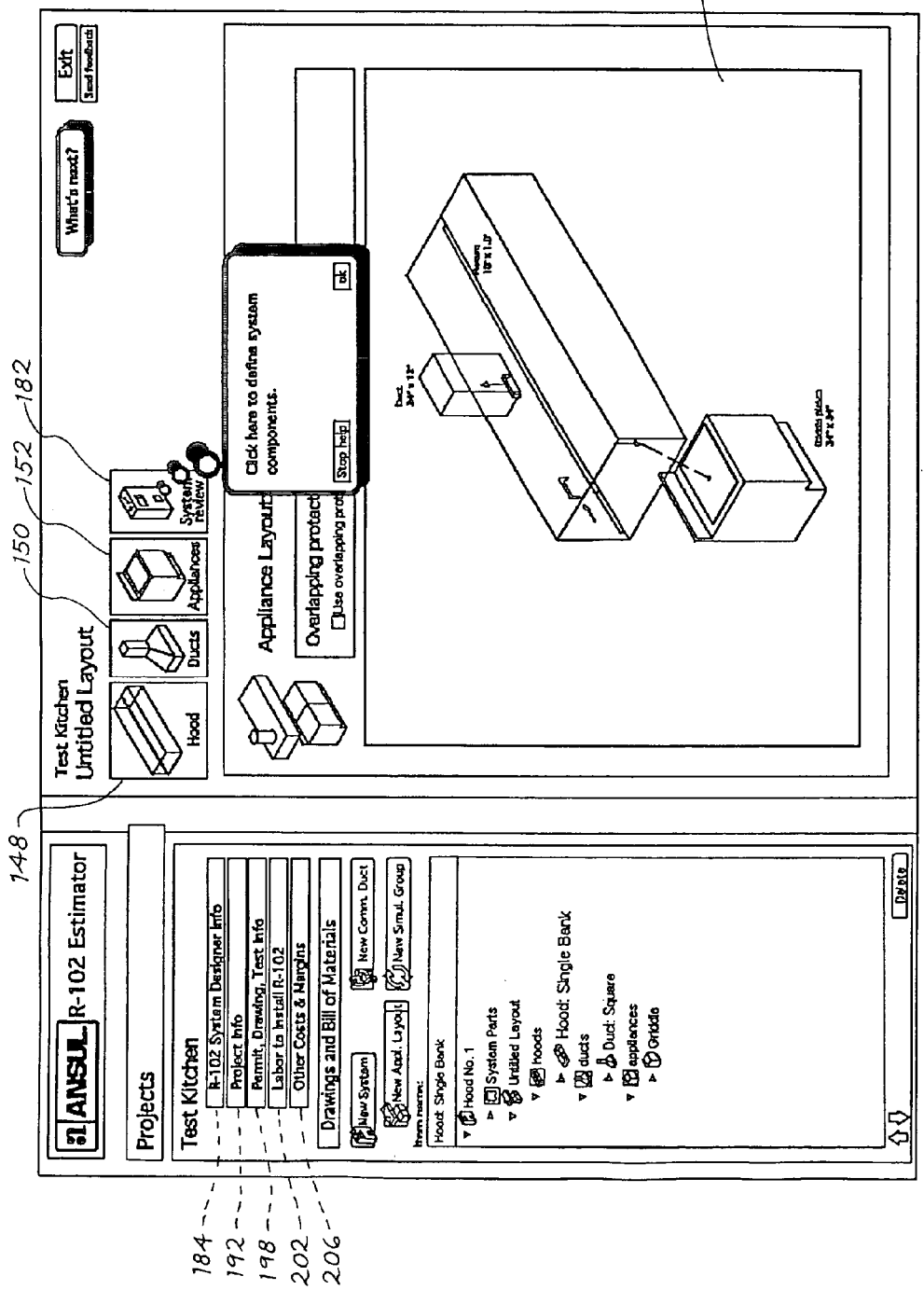
FIG. 15 shows the screen of FIG. 14 when an appliance is chosen.

The user selects a type/style of appliance via the input device 108 by clicking on the corresponding appliance shown on screen 146 of FIG. 13. A schematic drawing of the selected appliance is then shown in window 156 as shown in FIG. 14. The window 156 includes a number of windows 172 that allow the user to insert via input device 108 desired dimensions for the selected appliance. For example, the overall height, width, depth of the appliance, and the cooking surface depth and width can be chosen when applicable. Note that the overall height of appliances can be set to a constant value, such as 36 inches. The overall height can be adjusted as well. In addition, the position of the left side of the appliance (from perspective of appliance) with respect to the furthest left side of the ventilation hood(s) (when no previous appliances have been selected) or from the previously selected appliance can be selected by filling in window 178 as shown in FIG. 14. If window 178 is not filled in, then the left side of the appliance will be positioned to be either 1) aligned with the furthest left side of the ventilation hood(s) (when no previous appliances have been selected) or 2) flush against the right side of the previously selected appliance.

Note that in the case of ventilation hoods that allow banks of appliances to be back-to-back, such as the previously mentioned V-bank hood, the user designs one bank of the appliances in the manner described above. For designing the other bank of appliances, a "view other side" button is activated so as to switch the view of the screen. At this point, another bank of appliances is added in the same manner as described above.

Besides the various dimensions, a nozzle for the selected appliance can be chosen from a list of available nozzles 174, wherein those that are in bold are available for selection. Window 176 provides information where the selected nozzle is positioned relative to the selected appliance. Note that the locations for the nozzles as displayed in window 176 are stored in memory 106 and determined in the same manner described previously regarding the nozzles selected for the ventilation hood. Assuming that the appliance model, appliance dimensions and nozzle and flow specifications are correct, then an "Add" button is activated so that the displayed information is stored for the kitchen design. Activation of the "Add" button 164 results in a window forming that is similar to window 168 of FIG. 9 and which automatically displays a schematic drawing of the ventilation hood(s), duct(s) and appliance(s) that reflect the previously selected dimensions and relative positions of the various components. Again, the locations of the detectors and nozzles are indicated by inverted "U"'s and arrows, respectively.

Once the user settles on the fire suppression system to be used, the user can easily modify the arrangement of the appliances by selecting the "overlapping protection" button option (partially shown in FIG. 12). Activation of the button causes a shaded area to appear in the drawing. The shaded area defines a fire protection zone that is protected by the selected fire suppression system. If the user wishes to change the appliances previously selected for the fire suppression system, the user selects appliances so that they are encompassed by the shaded area. Appliances that do not fit within the area would not be protected by the fire suppression system and so should not be selected. Note that the nozzle locations are shown when the "overlapping protection" option is used. The shaded area generated when the "overlapping protection" is selected is based on assigning a certain depth and width of coverage for each nozzle. The nozzles are positioned so as to be separated from one another by 12 inches so that the nozzle discharge spray from each nozzle overlaps the nearest nozzle UL testing is performed to assure appliances at the end of the zones will be protected.

Additional appliances can be added in a manner similar to that described with respect to the ventilation hood and duct selection processes described previously with respect to FIGS. 6-11. In order to determine what appliances are available for placement below the selected ventilation hood(s), the user needs to know how much room is left under the ventilation hood(s) in view of any previously selected appliance(s). In particular, NFPA standards state that all appliances must fit under the ventilation hood and positioned six inches inward from each edge of the hood. The design program monitors the appliances chosen so that they conform to the NFPA standards. In particular, the design program compares the width of the appliance and determines whether or not the width meets the requirements of the above mentioned "six inch" rule. Should the user select an appliance that does not have a width that meets the "6 inch rule", then a yellow caution triangle will appear on the screen stating that the appliance has exceeded the acceptable dimensions. The design program also monitors the length of each appliance as measured along the longitudinal direction of the ventilation hood. The design program compares the cumulative longitudinal length taken up by the appliances, when all selected spacings between appliances is taken into account, with the 6 inch rule as applied to the left and right side edges of the selected ventilation hood. If the cumulative longitudinal length does not meet the 6 inch rule, then the caution triangle mentioned previously will appear and warn the user to revise his or selection of appliances in order to conform with the rule. In summary, the design program is designed to layout designs that are compliant with current NFPA standards.

Note that the user may select appliances not shown on screen by activating icon 180. Such activation results in a window popping up wherein the user types in the specific type and model of a desired appliance. The dimensions of the appliance and its spacing relative to the ventilation hood or previously selected appliance can be chosen as well in a manner similar to that described previously with respect to FIG. 14.

At any time during the selection process for the hood, duct or appliance, a summary of components chosen for a particular hood of a kitchen project can be displayed by clicking on the "System Review" icon 182. Upon clicking on icon 182 a summary screen 128, such as shown in FIG. 4, is shown on visual display 110. The summary screen 128 shows all components chosen to date regarding a particular hood. Note that when the hood, ducts and appliances are chosen, bringing up summary screen 128 will cause a prompt to be displayed asking that the type of appliance (electric or gas or-other) be chosen, the number of fusible links for particular temperature thresholds, such as 165° F., 212° F., 250° F., 360° F., 450° F. and 500° F. Such fusible links are fixed temperature heat detecting devices signal a control unit to activate the fire suppression system once the threshold temperature is reached. Other components of the fire suppression system, such as gas valves and hood seals, are entered by the user. A complete list of the components to be entered were mentioned previously with respect to the discussion of FIG. 4. Once all desired items have been entered, the corresponding hood system is complete and the above described selection process can be repeated for another hood to be used in the kitchen.

After all components of the kitchen have been chosen and saved, the user will be asked to fill in a number of information screens that relate to identifying the project, contact people, division of time on project, permit drawing information, pipe and conduit information and drawings and bill of materials information.

For example, information regarding the project and corresponding contact information can be stored by clicking on the "System Designer Info" area 184 that is present on any of the screens shown in FIGS. 3-15. A project screen 186 is then shown on visual display 110 as shown in FIG. 16. The user then fills in various information regarding the system designer by filling in the various windows shown in project screen 186. This information may be saved as the default designer and will automatically appear on future designs. The project name is automatically filled in with the project name entered in the screen 120 of FIG. 3. Access to the project screen can be obtained at any time by the user by clicking on the "System Designer Info" area 184.

Figure 17:
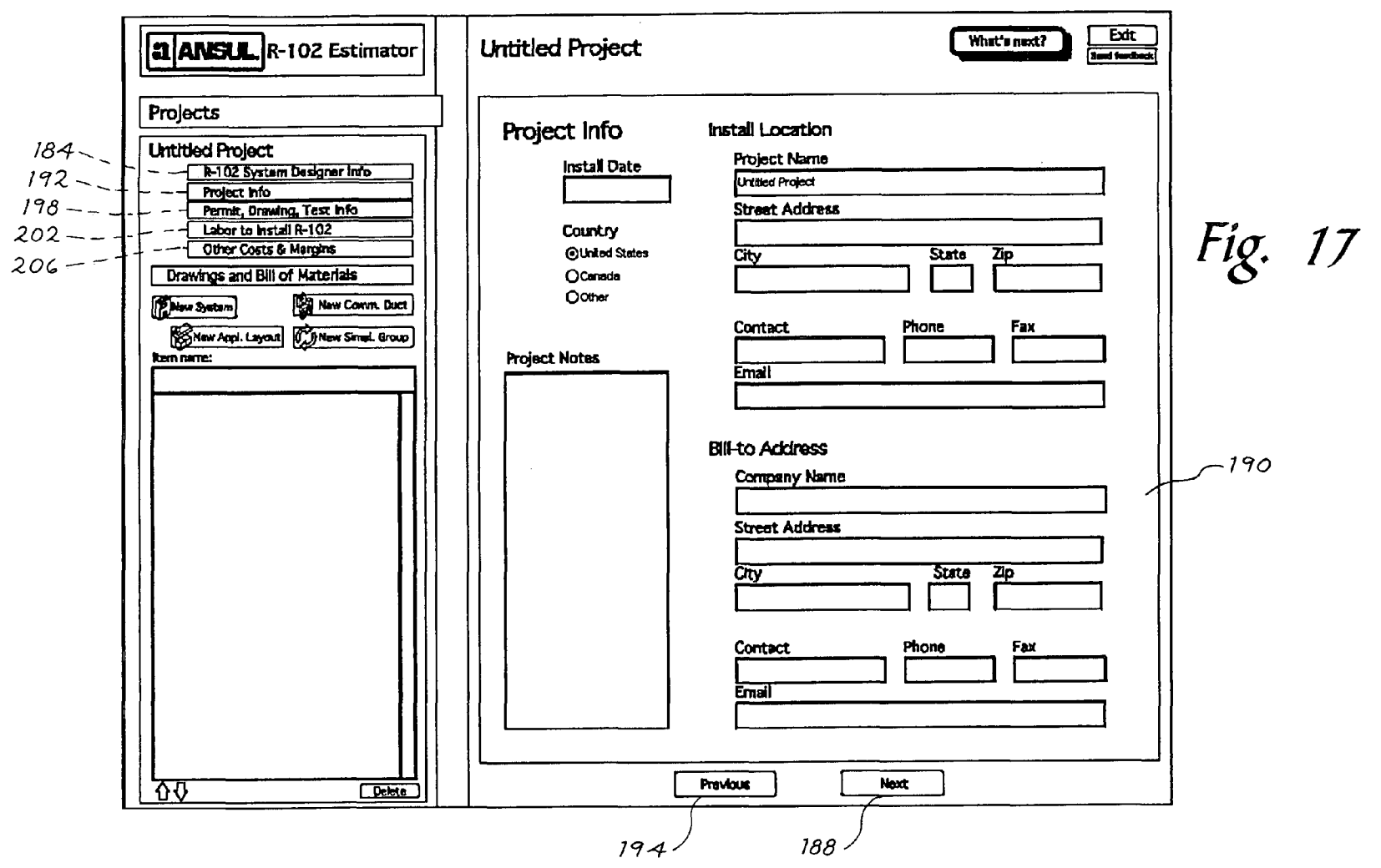

Once the information is entered on screen 186, the user clicks on the "Next" button 188 of the project screen 186 which results in an "Project Info" screen 190 being shown on visual display 110 as shown in FIG. 17. The user then fills in various information regarding the location where the kitchen with a fire suppression system is to be installed. Furthermore, the user fills in the address to where the bills for the project are to be sent. Access to the screen 190 can be obtained at any time by the user by clicking on the "Project Info" area 192. Access to the previous project screen 186 can be obtained by clicking on the "Previous" button 194.

Figure 18:
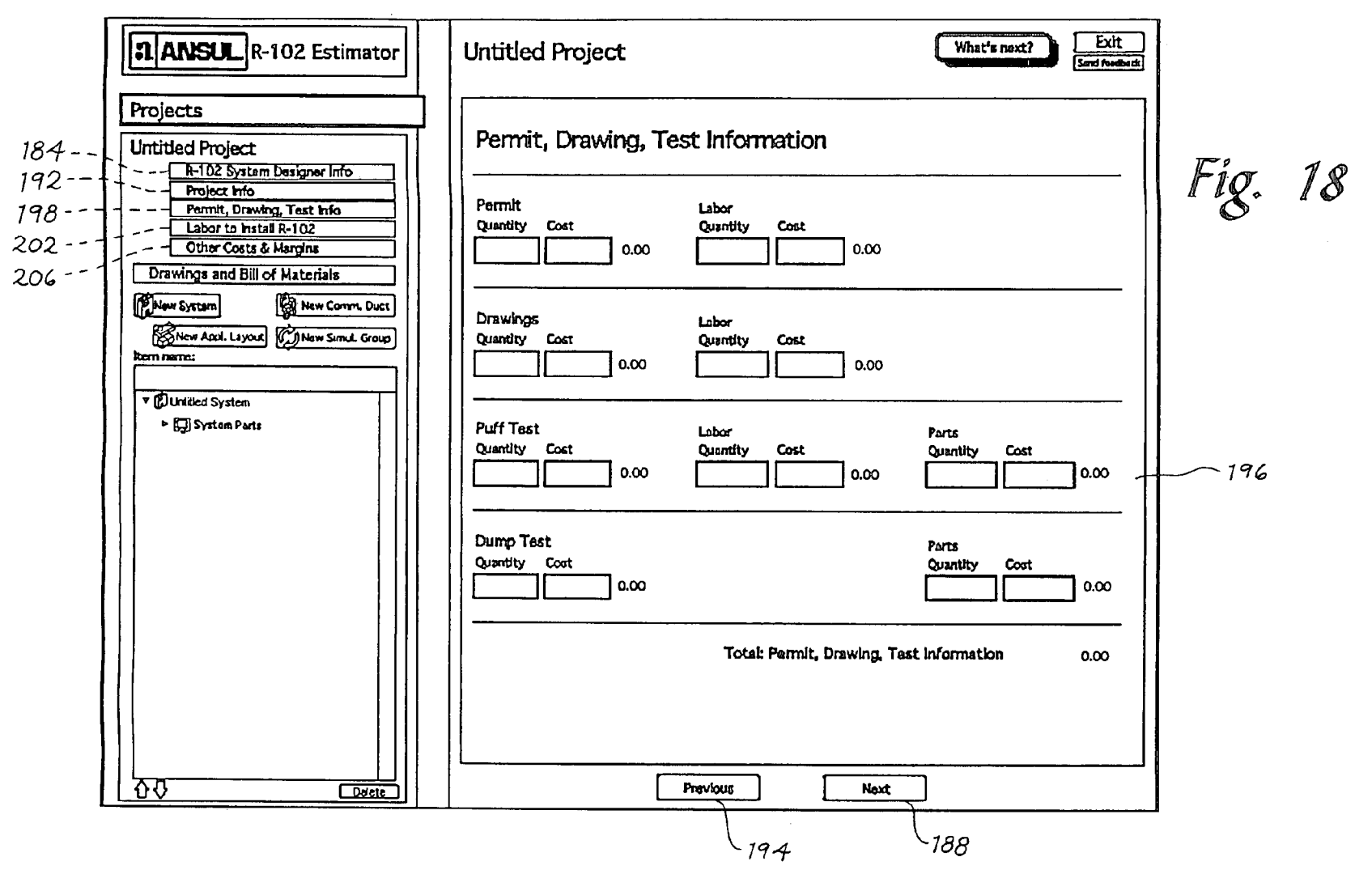

Once the information is entered on screen 190, the user clicks on the "Next" button 188, which results in a "Permit, Drawing, Test Information" screen 196 being shown on visual display 110 as shown in FIG. 18. The user then fills in various information regarding the costs for: 1) filing the permits required for the project (fees and labor), 2) preparing the drawings required for the project (fees and labor) and 3) various tests, such as pump and dump tests, required for the project (fees, labor when applicable and parts costs). The total cost is automatically presented on screen 196. Access to the screen 196 can be obtained at any time by the user by clicking on the "Permit, Drawings, Test Info." area 198. Access to the previous "Project Info" screen 190 can be obtained by clicking on the "Previous" button 194.

Figure 19:
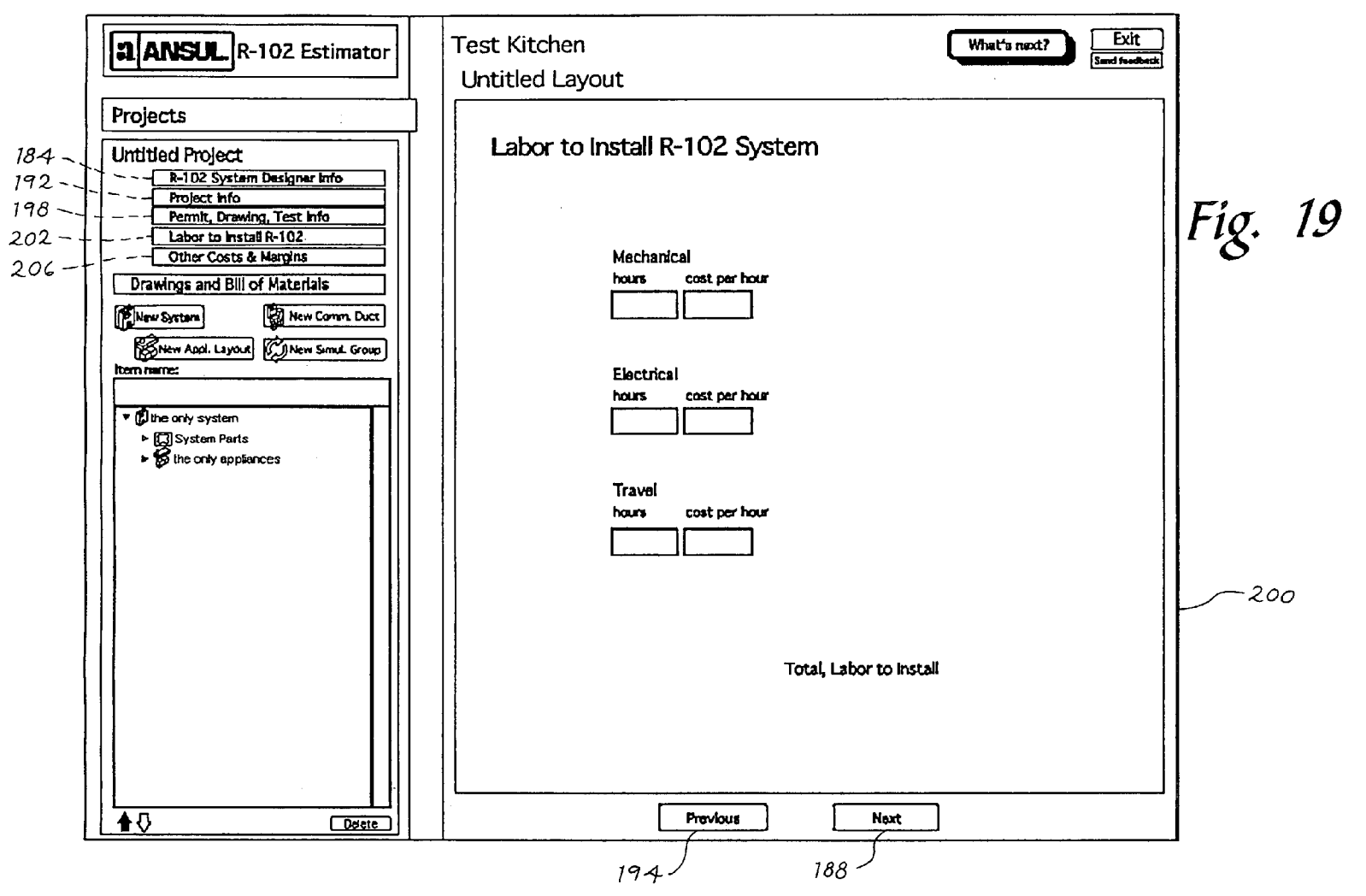

Once the information is entered on screen 196, the user clicks on the "Next" button 188 which results in a "Labor to Install System" screen 200 being shown on visual display 110 as shown in FIG. 19. The user then fills in various information regarding the projected labor costs for completing project as broken down by hours spent traveling and dealing with mechanical and electrical tasks regarding the project or by entering a fixed cost. The total cost of labor is automatically presented on screen 200. Access to the screen 200 can be obtained at any time by the user by clicking on the "Labor to Install System" area 202. Access to the previous "Permit, Drawing, Test Information" screen 196 can be obtained by clicking on the "Previous" button 194.

Figure 20:
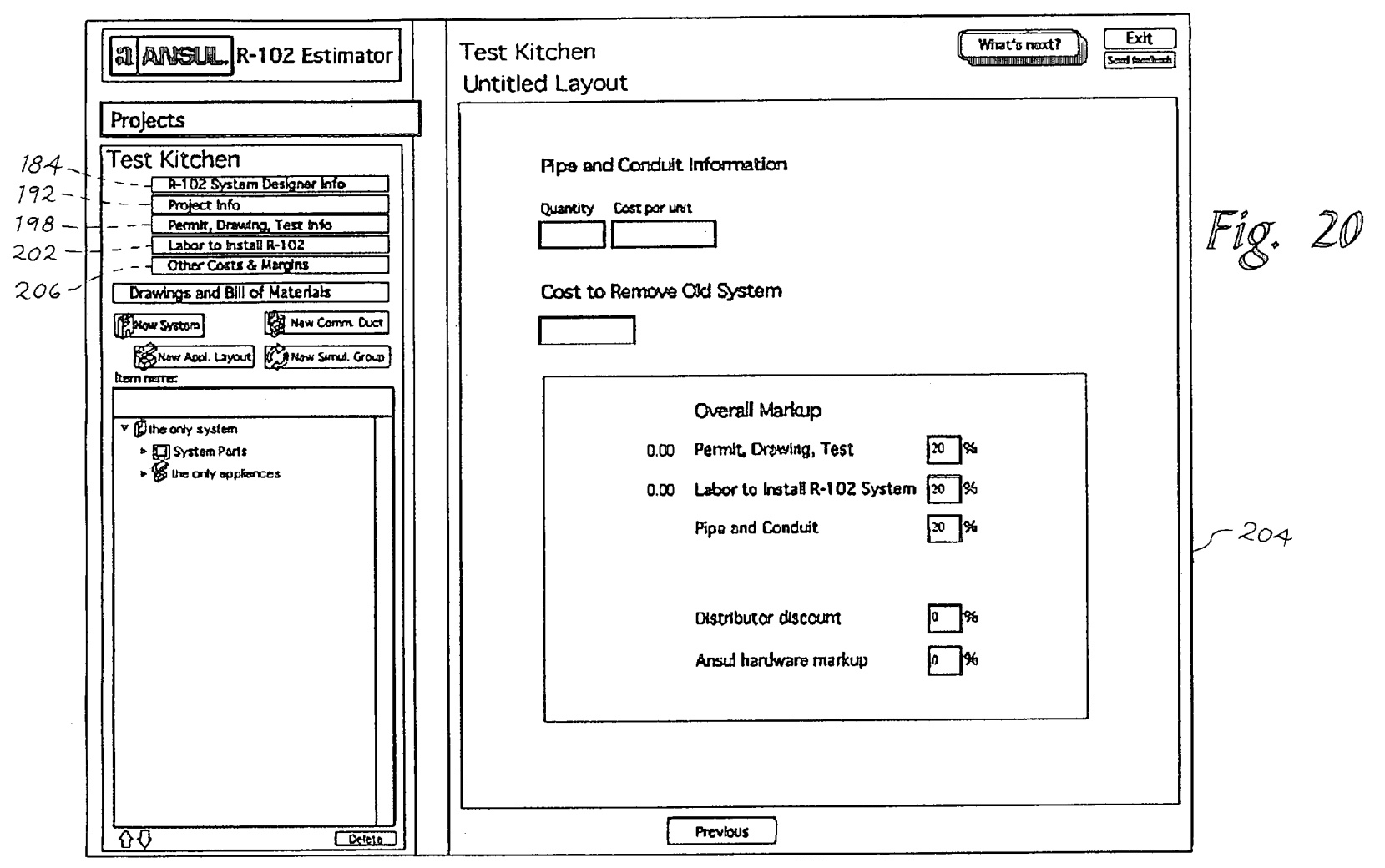

Once the information is entered on screen 200, the user clicks on the "Next" button 188, which results in a "Pipe and Conduit Information" screen 204 being shown on visual display 110 as shown in FIG. 20. The user then fills in various information regarding the projected costs for the pipes and conduits to be installed and the costs for removing the old kitchen system. Once those costs are entered, the user then enters in his or her markups for the various costs of the project, including permits, drawings, tests, labor to install the system, pipes and conduits costs. The costs determined for screens 196 and 200 are automatically presented on screen 204 along with the calculated markups for the permits/drawings, labor and pipes. Distributor discounts and manufacturer markups are also entered. Access to the screen 204 can be obtained at any time by the user by clicking on the "Other Costs and Margins" area 206. Access to the previous "Labor to Install" screen 200 can be obtained by clicking on the "Previous" button 194.

Entering the information requested by the screens of FIGS. 2-20 allows the user to easily begin the documentation and billing process for a particular project. This is accomplished by clicking on the "Drawings and Bill of Materials" button 208, which results in a "Drawings and Bill of Materials" screen 210 being shown on visual display 110. The screen contains four sectors. The first sector 212 shows a schematic of the R-102 System hardware (Tanks, Mechanical Release, and Regulated Actuators) and associated components, such as Gas Valves and Manual Pull Stations, to be used in the kitchen design. The second sector 214 shows a schematic shows a schematic drawing of the hoods, ducts and appliances chosen along with selected nozzles and flows. The sector 214 also includes a flow summary that includes the selected components (hood, duct and appliance), their dimensions, their associated selected nozzle, their flows and notes regarding the positioning of each component. The third sector 216 shows a bill of materials for the materials selected in screen 128 of FIG. 4 so as to install the fire suppression system associated with the selected ventilation hood, duct(s) and appliance(s). The fourth sector shows notes for the various drawings of sectors 212 and 214.

Selecting the "Print" button 220 results in all of the drawings/sheets associated with the sectors 212, 214, 216 and 218 to be printed. The drawings printed out will be in a form that will be either acceptable or easily adapted for filing with a vast majority of state and local regulatory agencies empowered to regulate installation of the fire suppression system. For example, the drawings are easily adapted to accommodate various requirements, such as margin size, color, paper size (i.e., 11×17 drawings), particular views of the design. Information regarding the location for the design, the identification of the installer, the fire system details, and dates of testing can be added as well.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

We claim:

1. A fire suppression system design tool comprising:
a processor;
a memory in communication with said processor, wherein said memory comprises a design program having a database; and
a visual display in communication with said processor, wherein said processor and said design program cooperate so that:
a fire suppression component is displayed on a screen of said visual display;
a plurality of appliances to be used with said fire suppression component are displayed on said screen;
an input device in communication with said processor, wherein said input device selects 1) one of said plurality of appliances displayed on said screen, 2) dimensions of said one of said plurality of appliances via entry into a number of windows on said screen, and 3) a relative position between said fire suppression component and said one of said plurality of appliances.

2. The fire suppression system design tool of claim 1, wherein said input device selects said relative position by inputting into a window on said screen a distance that said one of said plurality of appliances is spaced from said fire suppression component.

3. The fire suppression system design tool of claim 1, wherein said input device selects said relative position by inputting into a window on said screen a distance that said one of said plurality of appliances is spaced from a previously selected appliance.

4. The fire suppression system design tool of claim 1, wherein said fire suppression component is a ventilation hood.

5. The fire suppression system design tool of claim 1, wherein a nozzle that dispenses an agent is displayed on said screen with said one of said plurality of appliances, wherein said nozzle is positioned optimally on said screen relative to said one of said plurality of appliances so that said agent would put out a fire hazard occurring at said one of said plurality of appliances.

6. The fire suppression system design tool of claim 5, wherein a window is present on said screen that displays an optimum spacing between said nozzle and said one of said plurality of appliances so that said agent would put out said fire hazard.

7. A fire suppression system design tool comprising:
a processor;
a memory in communication with said processor, wherein said memory comprises a design program having a database; and
a visual display in communication with said processor, wherein said processor and said design program cooperate so that:
a fire suppression component is displayed on a screen of said visual display;
an appliance is displayed on said screen;
positions of one or more nozzles to be used with said fire suppression component are calculated by said processor and said one or more nozzles dispense an agent and are displayed on said screen with said fire suppression component taking into account said calculated positions, wherein said appliance on said screen is positioned so that said agent puts out a fire hazard that occurs at said appliance.

8. The fire suppression system design tool of claim 7, wherein said fire suppression component is a ventilation hood.

9. The fire suppression system design tool of claim 7, wherein a window is present on said screen that displays an optimum spacing between said one or more nozzles and said appliance so that said agent would put out said fire hazard.

10. A method of designing a fire suppression system, the method comprising:
displaying a fire suppression component on a screen of a visual display;
displaying a plurality of appliances to be used with said fire suppression system on said screen; and
selecting one of said plurality of appliances displayed on said screen and selecting a relative position between said fire suppression component and said one of said plurality of appliances, wherein said selecting comprises inputting into a window on said screen a distance that said one of said plurality of appliances is spaced from said fire suppression component.

11. The method of claim 10, wherein said fire suppression component is a ventilation hood.

12. The method of claim 10, further comprising displaying a nozzle that dispenses an agent on said screen with said one of said plurality of appliances, wherein said nozzle is positioned optimally on said screen relative to said one of said plurality of appliances so that said agent would put out a fire hazard occurring at said one of said plurality of appliances.

13. The method of claim 12, further comprising displaying in a window present on said screen an optimum spacing between said nozzle and said one of said plurality of appliances so that said agent would put out said fire hazard.

14. A method of designing a fire suppression system, the method comprising:
displaying a fire suppression component on a screen of a visual display;
displaying a plurality of appliances to be used with said fire suppression system on said screen; and
selecting one of said plurality of appliances displayed on said screen and selecting a relative position between said fire suppression component and said one of said plurality of appliances, wherein said selecting comprises inputting into a window on said screen a distance that said one of said plurality of appliances is spaced from a previously selected appliance.

15. The method of claim 14, further comprising displaying a nozzle that dispenses an agent on said screen with said one of said plurality of appliances, wherein said nozzle is positioned optimally on said screen relative to said one of said plurality of appliances so that said agent would put out a fire hazard occurring at said one of said plurality of appliances.

16. The method of claim 15, further comprising displaying in a window present on said screen an optimum spacing between said nozzle and said one of said plurality of appliances so that said agent would put out said fire hazard.

* * * * *